(12) United States Patent
Arumugam

(10) Patent No.: US 9,638,521 B2
(45) Date of Patent: May 2, 2017

(54) DECOUPLED MAGNETOQUASISTATIC NON-LINE-OF-SIGHT POSITION AND ORIENTATION SENSING FOR ARBITRARY DISTANCES

(71) Applicant: CALIFORNIA INSTITUTE OF TECHNOLOGY, Pasadena, CA (US)

(72) Inventor: Darmindra D. Arumugam, Pasadena, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 51 days.

(21) Appl. No.: 14/876,736

(22) Filed: Oct. 6, 2015

(65) Prior Publication Data

US 2016/0097656 A1 Apr. 7, 2016

Related U.S. Application Data

(60) Provisional application No. 62/060,714, filed on Oct. 7, 2014, provisional application No. 62/079,738, filed on Nov. 14, 2014, provisional application No. 62/160,129, filed on May 12, 2015.

(51) Int. Cl.
*G01D 5/20* (2006.01)
*G01C 15/00* (2006.01)
*G01B 7/14* (2006.01)
*G01S 1/08* (2006.01)

(52) U.S. Cl.
CPC .............. *G01C 15/00* (2013.01); *G01B 7/14* (2013.01); *G01S 1/08* (2013.01)

(58) Field of Classification Search
CPC ...... G01C 15/00; G01D 5/204; G01D 5/2086; G01B 7/004; G01B 7/14; G01B 7/003; G01R 35/005; G01V 3/081; G01V 13/00; G01V 3/08; G01S 3/14; G01S 1/08; G01S 5/00; A61B 5/06; A61B 5/6806; A61B 34/02
USPC ........................................ 324/207.15–207.25
See application file for complete search history.

(56) References Cited

U.S. PATENT DOCUMENTS

| | | | | |
|---|---|---|---|---|
| 4,314,251 A | * | 2/1982 | Raab | G01S 3/14 324/207.24 |
| 6,757,557 B1 | * | 6/2004 | Bladen | A61B 5/06 128/899 |
| 8,723,509 B2 | * | 5/2014 | Patterson, III | G01B 7/004 324/202 |

OTHER PUBLICATIONS

Arumugam, D. et al. "Error reduction in magnetoquasistatic positioning using orthogonal emitter measurements". *Antennas and Wireless Propagation Letters, IEEE*, 11; pp. 1462-1465, Nov. 27, 2012.

(Continued)

*Primary Examiner* — Jay Patidar
(74) *Attorney, Agent, or Firm* — Steinfl + Bruno LLP

(57) ABSTRACT

Methods and systems for non-line-of-sight positioning are disclosed for arbitrarily short to long ranges, where positioning is achieved using a single anchor not requiring tri-/multi-lateration or tri-/multi-angulation. Magnetoquasistatic fields can be used to determine position and orientation of a device in two or three dimensions. Two or three axis coils can be used in receivers and transmitters. The magnetoquasistatic equations are solved in different scenarios, taking into consideration the image signals originating from the interaction between the fields and ground/earth.

30 Claims, 19 Drawing Sheets

(56) References Cited

OTHER PUBLICATIONS

Arumugam, D. et al. "Three-dimensional position and orientation measurements using magneto-quasistatic fields and complex image theory [measurements corner]". *Antennas and Propagation Magazine, IEEE*, 56(1); pp. 160-173, Feb. 2014.

Arumugam, D. et al. "Experimental demonstration of complex image theory and application to position measurement". *Antennas and Wireless Propagation Letters, IEEE*, 10; pp. 282-285, Apr. 5, 2011.

Denis, B. et al. "Impact of NLOS propagation upon ranging precision in UWB systems"., *2003 IEEE Conference on Ultra Wideband Systems and Technologies*, pp. 379-383, Nov. 16-19, 2003.

Fang, D. et al. "Discrete image theory for horizontal electric dipoles in a multilayered medium". *IEE Proceedings on Microwaves, Antennas and Propagation*, 135(5); pp. 297-303, Oct. 1988.

Jiang, Z. et al. "NLOS GPS signal detection using a dual-polarisation antenna". *GPS Solutions*, 18; pp. 15-26, Dec. 28, 2012.

Koutsou, A.D. et al. "Preliminary localization results with an RFID based indoor guiding system". *WISP 2007. IEEE International Symposium on Intelligent Signal Processing*, pp. 1-6, Oct. 3-5, 2007.

Raab, F.R. "Quasi-static magnetic-field technique for determining position and orientation". *IEEE Trans. on Geoscience and Remote Sensing*, GE-19(4) pp. 235-243, Oct. 1981.

Raab, F.R. et al. "Magnetic Position and Orientation Tracking System". *IEEE Trans. on Aerospace and Electrical Systems*, AES-15(5); pp. 709-718, Sep. 1979.

Schweizer, J. et al. "Testing the performance of avalanche transceivers". *Cold Regions Science and Technology*, 37(3); pp. 429-438, Nov. 2003.

Arumugam, D. "Decoupled range and orientation sensing in long-range magnetoquasistatic positioning." *Antennas and Wireless Propagation Letters, IEEE*. 14; pp. 654-657, Feb. 26, 2015.

Arumugam, D. et al. "Higher order loop corrections for short range magnetoquasistatic position tracking". In *2011 IEEE International Symposium on Antennas and Propagation (AS-S/URSI)* pp. 1755-1757, Jul. 3-8, 2011.

Kriezis et al. "Eddy current distribution and loss in a semi-infinite conducting space due to a vertical current loop". *ETZArchiv*, pp. 201-207, Jul. 1979.

\* cited by examiner

DECOUPLED MAGNETOQUASISTATIC NON-LINE-OF-SIGHT POSITION AND ORIENTATION SENSING FOR ARBITRARY DISTANCES

CROSS REFERENCE TO RELATED APPLICATIONS

The present application claims priority to U.S. Provisional Patent Application No. 62/060,714, filed on Oct. 7, 2014, US Provisional Patent Application No. 62/079,738, filed on Nov. 14, 2014, and U.S. Provisional Patent Application No. 62/160,129, filed on May 12, 2015, and is related to U.S. patent application Ser. No. 12/824,894, filed on Jun. 28, 2010, the disclosure of each of which is incorporated herein by reference in its entirety.

STATEMENT OF INTEREST

The invention described herein was made in the performance of work under a NASA contract, and is subject to the provisions of Public Law 96-517 (35 USC 202) in which the Contractor has elected to retain title.

TECHNICAL FIELD

The present disclosure relates to non-line-of-sight positioning. More particularly, it relates to magnetoquasistatic non-line-of-sight positioning.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
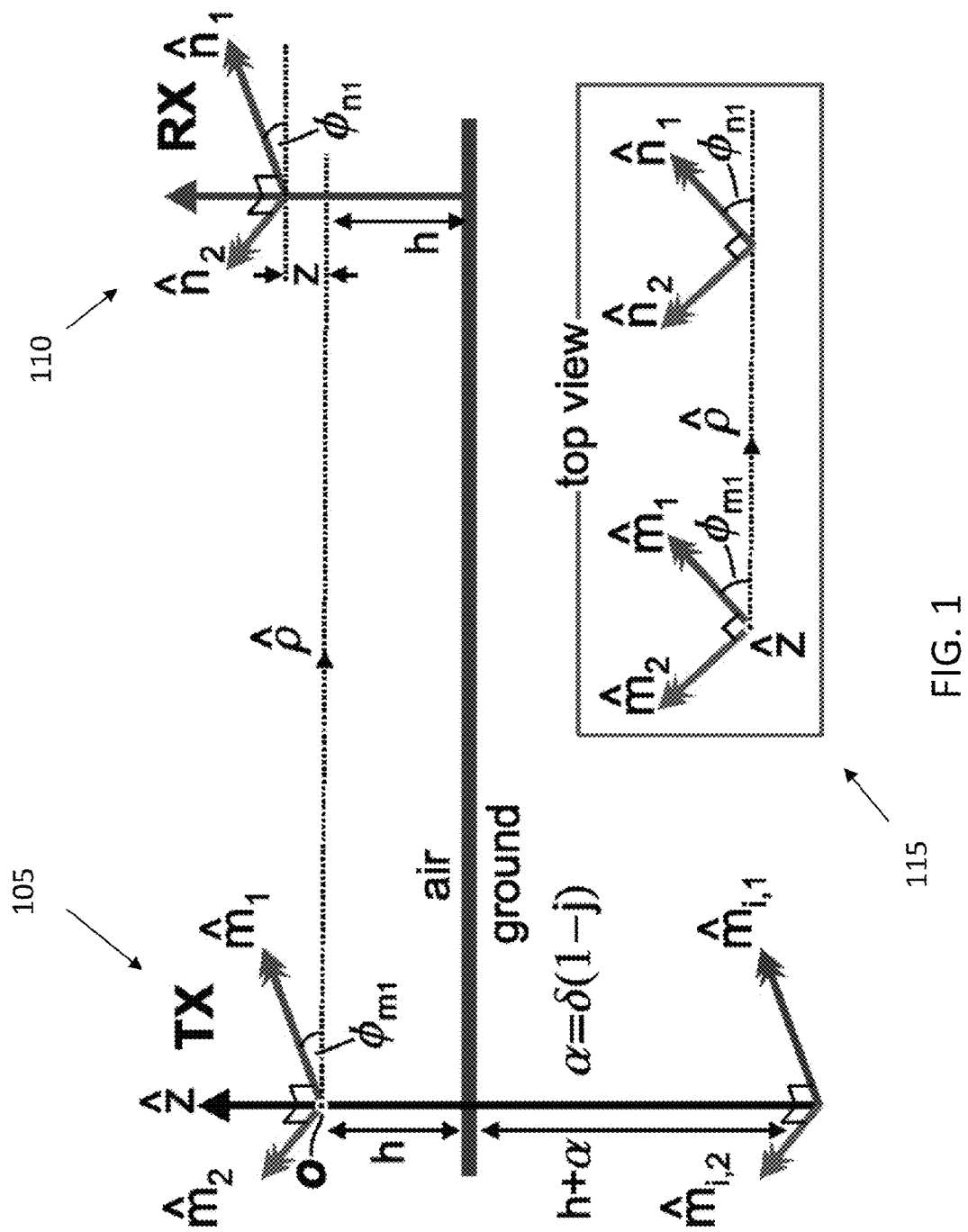
FIG. 1 illustrates exemplary configurations of the two-axis transmit (105) and receive (110) systems.

In a first aspect of the disclosure, a method is described, the method comprising: providing a receiver, the receiver comprising a first and second receiver coils configured to receive quasistatic magnetic fields in a first and second mutually orthogonal directions transmitted by a transmitter, the transmitter comprising a first and second transmitter coils and configured to transmit the quasistatic magnetic fields in a third and fourth mutually orthogonal directions; receiving the quasistatic magnetic fields through the receiver; measuring, with the receiver, a first voltage originating from the quasistatic magnetic fields due to coupling between the first transmitter coil and the first receiver coil; measuring, with the receiver, a second voltage originating from the quasistatic magnetic fields due to coupling between the second transmitter coil and the first receiver coil; measuring, with the receiver, a third voltage originating from the quasistatic magnetic fields due to coupling between the first transmitter coil and the second receiver coil; measuring, with the receiver, a fourth voltage originating from the quasistatic magnetic fields due to coupling between the second transmitter coil and the second receiver coil; based on the first, second, third, and fourth voltages, calculating a distance between the receiver and the transmitter, wherein the measuring of each of the first, second, third, and fourth voltages is independent from the remaining voltages.

In a second aspect of the disclosure, a method is described, the method comprising: providing a receiver, the receiver comprising a first and second receiver coils configured to receive quasistatic magnetic fields in a first and second mutually orthogonal directions; providing a transmitter, the transmitter comprising a first and second transmitter coils and configured to transmit the quasistatic magnetic fields in a third and fourth mutually orthogonal directions; transmitting the quasistatic magnetic fields through the transmitter; receiving the quasistatic magnetic fields through the receiver; measuring, with the receiver, a first voltage originating from the quasistatic magnetic fields due to coupling between the first transmitter coil and the first receiver coil; measuring, with the receiver, a second voltage originating from the quasistatic magnetic fields due to coupling between the first transmitter coil and the second receiver coil; measuring, with the receiver, a third voltage originating from the quasistatic magnetic fields due to coupling between the second transmitter coil and the first receiver coil; measuring, with the receiver, a fourth voltage originating from the quasistatic magnetic fields due to coupling between the second transmitter coil and the second receiver coil; based on the first, second, third, and fourth voltages, calculating a distance between the receiver and the transmitter, wherein the measuring of each of the first, second, third, and fourth voltages is independent from the remaining voltages.

In a third aspect of the disclosure, a method is described, the method comprising: providing a receiver, the receiver comprising a first, second and third receiver coils configured to receive quasistatic magnetic fields in a first, second and third mutually orthogonal directions transmitted by a transmitter, the transmitter comprising a first, second and third transmitter coils and configured to transmit the quasistatic magnetic fields in a fourth, fifth and sixth mutually orthogonal directions; receiving the quasistatic magnetic fields through the receiver; measuring, with the receiver, a first voltage originating from the quasistatic magnetic fields due to coupling between the first transmitter coil and the first receiver coil; measuring, with the receiver, a second voltage originating from the quasistatic magnetic fields due to coupling between the first transmitter coil and the second receiver coil; measuring, with the receiver, a third voltage originating from the quasistatic magnetic fields due to coupling between the first transmitter coil and the third receiver coil; measuring, with the receiver, a fourth voltage originating from the quasistatic magnetic fields due to coupling between the second transmitter coil and the first receiver coil; measuring, with the receiver, a fifth voltage originating from the quasistatic magnetic fields due to coupling between the second transmitter coil and the second receiver coil; measuring, with the receiver, a sixth voltage originating from the quasistatic magnetic fields due to coupling between the second transmitter coil and the third receiver coil; measuring, with the receiver, a seventh voltage originating from the quasistatic magnetic fields due to coupling between the third transmitter coil and the first receiver coil; measuring, with the receiver, an eighth voltage originating from the quasistatic magnetic fields due to coupling between the third transmitter coil and the second receiver coil; measuring, with the receiver, a ninth voltage originating from the quasistatic magnetic fields due to coupling between the third transmitter coil and the third receiver coil; based on the first, second, third, fourth, fifth, sixth, seventh, eighth and ninth voltages, calculating a distance between the receiver and the transmitter, wherein the measuring of each of the first, second, third, fourth, fifth, sixth, seventh, eighth and ninth voltages is independent from the remaining voltages.

In a fourth aspect of the disclosure, a method is described, the method comprising: providing a receiver, the receiver comprising a first, second and third receiver coils configured to receive quasistatic magnetic fields in a first, second and third mutually orthogonal directions; providing a transmitter, the transmitter comprising a first, second and third transmitter coils and configured to transmit the quasistatic magnetic fields in a fourth, fifth and sixth mutually orthogonal directions; receiving the quasistatic magnetic fields through the receiver; measuring, with the receiver, a first voltage originating from the quasistatic magnetic fields due to coupling between the first transmitter coil and the first receiver coil; measuring, with the receiver, a second voltage originating from the quasistatic magnetic fields due to coupling between the first transmitter coil and the second receiver coil; measuring, with the receiver, a third voltage originating from the quasistatic magnetic fields due to coupling between the first transmitter coil and the third receiver coil; measuring, with the receiver, a fourth voltage originating from the quasistatic magnetic fields due to coupling between the second transmitter coil and the first receiver coil; measuring, with the receiver, a fifth voltage originating from the quasistatic magnetic fields due to coupling between the second transmitter coil and the second receiver coil; measuring, with the receiver, a sixth voltage originating from the quasistatic magnetic fields due to coupling between the second transmitter coil and the third receiver coil; measuring, with the receiver, a seventh voltage originating from the quasistatic magnetic fields due to coupling between the third transmitter coil and the first receiver coil; measuring, with the receiver, an eighth voltage originating from the quasistatic magnetic fields due to coupling between the third transmitter coil and the second receiver coil; measuring, with the receiver, a ninth voltage originating from the quasistatic magnetic fields due to coupling between the third transmitter coil and the third receiver coil; based on the first, second, third, fourth, fifth, sixth, seventh, eighth and ninth voltages, calculating a distance between the receiver and the transmitter, wherein the measuring of each of the first, second, third, fourth, fifth, sixth, seventh, eighth and ninth voltages is independent from the remaining voltages.

DETAILED DESCRIPTION

Existing radiolocation systems such as the Global Positioning System (GPS), Radio-Frequency Identification (RFID) systems, and Ultra Wide-Band (UWB) systems are based on propagating electromagnetic (EM) waves. These systems have reduced accuracy in non-line-of-sight (NLoS) environments due to propagation losses, delays, or multipath effects, see for example Refs. [4, 6, 7]. In contrast, magnetoquasistatic (MQS) fields are not significantly disturbed and can offer accurate radiolocation in NLoS environments, see Ref. [3]. Magnetoquasistatic fields are a class of electromagnetic fields in which a slowly oscillating magnetic field is dominant. A magnetoquasistatic field is typically generated by low-frequency induction from a magnetic dipole or a current loop or coil. In the past, MQS systems using frequencies of up to a few kiloHertz were developed for above ground positioning, see Ref. [8, 9]. These techniques did not account for induced eddy-currents in the ground, which limited the range of operation to a few meters above the ground. However, this simplification in the technology did permit a decoupled solution for position and orientation, see Ref. [9]. The decoupling of position and orientation sensing is important in magnetoquasistatic systems to provide linear unambiguous solutions and also for low-latency or fast solution times.

The solutions are decoupled when both the position and orientation of an object can be determined through equations that are not coupled and can be solved separately and independently. Long-range MQS positioning above ground was recently demonstrated using frequencies of a few-hundred kiloHertz and by accounting for the induced eddy-currents in the ground, see Ref [3]. However, the strong ground effects did not permit a decoupled solution for range and orientation of the device to be radiolocated, and instead required solution of non-linear coupling equations. Due to use of the non-linear field coupling equations, see Ref. [3], previous attempts to extend the long-range MQS technique to 2D and 3D have resulted in solutions that exhibit large errors (1-3 m), which are strongly varying as a function of the orientation and position of the transmitter and receivers, see Ref. [2]. Furthermore, the complexity in the non-linear solution space impedes the ability to converge to a correct solution, or to solve in real-time. Attempts to use orthogonal fields to aid the non-linear convergence has resulted in slight improvements in accuracies at the expense of significantly more complicated algorithms with high computational complexity, see Ref [1].

The present disclosure describes a long-range MQS technique to accurately determine the orientation-invariant range and range-invariant orientation of a device above ground. To achieve this, the non-linear field equations describing the coupling, which includes ground effects, are decoupled into range and orientation field equations that can be directly inverted.

FIG. 1 illustrates exemplary configurations of the two-axis transmit (105) and receive (110) systems. The transmitted fields generate eddy-currents which create secondary fields. These secondary fields are approximately modeled using complex image theory for simplicity, see Ref. [3]. FIG. 1 illustrates also a top view of the systems (115).

The vector magnetic field of an electrically-small coil driven by a current is given by (see Ref. [3]):

$$\vec{B}(x,y,z) = \frac{\mu_0}{4\pi}\left[\frac{3(\hat{m}\cdot\hat{r})\hat{r}-\hat{m}}{r^3}\right], \quad (1)$$

where $\vec{r}=r\hat{r}$ is the range vector centered at the origin of the coil, $\vec{m}$ is the vector magnetic moment of the transmitter and where the moment is assumed unity, i.e., $|\vec{m}|=1$ Am². The voltage measured by a receiving coil within the quasi-static region is given by $V=-j\omega[\vec{B}\cdot\hat{n}]a$, where a is the surface area of the receive coil, and $\hat{n}$ is the receiver's surface normal unit vector. Induced eddy-currents in the ground generate secondary fields detected by the receiver, which can be modeled using complex image theory as indicated in FIG. 1 (see Ref. [3]). The total voltage measured at the receiver is given by $V_T = V_{m\to n} + V_{mi\to n}$, where $V_{m\to n}$ is the voltage induced in the receiver due to the transmit direct fields, $V_{mi\to n}$ is the voltage induced in the receiver due to the image fields of $\vec{m}^i$. The total voltage is therefore given by:

$$V_T = -j\frac{\omega\mu_0 a}{4\pi}\left[\frac{3(\hat{m}\cdot\hat{r})(\hat{n}\cdot\hat{r})-\hat{m}\cdot\hat{n}}{r^3} + \frac{3(\hat{m}_i\cdot\hat{r}_i)(\hat{n}\cdot\hat{r}_i)-\hat{m}_i\cdot\hat{n}}{r_i^3}\right]. \quad (2)$$

Of concern are the radial ranging near the 2D xy-plane, and the orientation of the transmitter about the $\hat{z}$ axis. Horizontal magnetic moments are chosen for the transmit and receive (vertical coils), and cylindrical coordinates are used to describe the problem. In the cylindrical system, $\hat{r}=(\rho/r)\hat{\rho}+(z/r)\hat{z}$, where $r=(\rho^2+z^2)^{1/2}$, and $\hat{r}_i=(\rho/r_i)\hat{\rho}+[(z+H)/r_i]\hat{z}$, where $r_i=(\rho^2+(z+H)^2)^{1/2}$, and $H=2h+\alpha$. Here $\alpha=\delta(1-j)$, where $\delta$ is the skin depth of penetration in the ground. Due to the use of horizontal magnetic moments or vertical coils (that implies $\theta=90°$), $\hat{m}\cdot\hat{z}=\hat{m}_i\cdot\hat{z}=\hat{n}\cdot\hat{z}=\hat{n}_i\cdot\hat{z}=0$, and $\hat{,}=\hat{m}=\hat{m}_i$, which substantially simplifies the total voltage due to the transmitter and ground to:

$$V_T = \\ -j\frac{\omega\mu_0 a}{4\pi}\left[\frac{3(\rho/r)^2(\hat{m}\cdot\hat{\rho})(\hat{n}\cdot\hat{\rho})-\hat{m}\cdot\hat{n}}{r^3} + \frac{3(\rho/r_i)^2(\hat{m}\cdot\hat{\rho})(\hat{n}\cdot\hat{\rho})-\hat{m}_i\cdot\hat{n}}{r_i^3}\right]. \quad (3)$$

Due to operation close to the 2D xy-plane, it is assumed that $z\to 0$ and hence $\rho/r\approx 1$. The asymptotic convergence from the source field at near ranges, to the complex image contribution at far ranges, is understood in the context of complex image theory, see Ref [3]. At short ranges ($\rho\ll H$), it is found that $\rho/r_i\approx\rho/H\to 0$ and $1/r^3\gg 1/r_i^3$, so that the source field significantly dominates the sensed voltage. On the other hand, at long ranges ($\rho\gg H$), it is found that $\rho/r_i\to 1$ and $1/r^3\approx 1/r_i^3$, so that both source and image fields contribute to the sensed voltage, but the scaling of the dot-product in the numerator of the image contributions are not significant. In summary, at short ranges only the source field is significant, but $\rho/r\approx 1$, whereas at long ranges, both source and image fields are important, but $\rho/r_i\to 1$. The total voltage can now be approximately re-written as:

$$V_T \approx -j\frac{\omega\mu_0 a}{4\pi}[3(\hat{m}\cdot\hat{\rho})(\hat{n}\cdot\hat{\rho})-\hat{m}\cdot\hat{n}]\times\left[\frac{1}{r^3}+\frac{1}{r_i^3}\right] \quad (4)$$

where the r and $r_i$ are kept in the denominator since the cubic dependence offers high sensitivity to z or H. The term on the right ($1/r^3+1/r_i^3$), is the geometric distance function from complex image theory, see Ref. [3], and can be replaced by using higher-order discrete complex images (see Ref. [5]) when slightly higher accuracy is needed at $\rho\approx H$. However, the higher-order images provide diminished returns due to further depths.

The description of the voltage sensed at the receiver given in Eq. (4) is simpler than that used in previous documents, see Refs. [2, 3]. However, it is still non-linear, as the orientation of the transmitter, orientation of the receiver, and range functions are strongly coupled. Previous attempts to extend Eq. (2) to 2D and 3D (see Ref [2]) have resulted in large errors (1-3 m), which are also strongly dependent on the orientation and position of the devices. The non-linear solution space is also complex and often prevents convergence to a correct solution or any real-time solution.

To solve this problem, it can be noted that Eq. (4) has a similar form to the traditional free-space magnetoquasistatic (MQS) coupling equation, and thus can be decoupled in a related manner to that in short-range MQS techniques, see Ref. [9]. A 2-axis transmit and receiver concept as shown in FIG. 1 is used, where each axis ($\hat{m}_1$, $\hat{m}_2$) of the transmitter system, and similarly each axis ($\hat{n}_1$, $\hat{n}_2$) of the receiver system, are horizontal and orthogonal to each other. The orientations of the transmitter and receiver systems are arbitrary with respect to each other. Due to this 2×2 configuration, there is a total of four field equations generated. These four equations can be considered by first focusing on the contributions at both receivers due to transmitter 1. At receiver 1, taking note that $\hat{\rho}\cdot\hat{m}_1=\cos\phi_{m1}$, $\hat{\rho}\cdot\hat{n}_1=\cos\phi_{n1}$, and $\hat{m}_1\cdot\hat{n}_1=\cos(\phi_{m1}-\phi_{n1})=\cos\phi_{m1}+\sin\phi_{n1}\sin\phi_{m1}$, it is possible to re-write the total voltage for this case as:

$$V_{T(m1\to n1)} = -j\frac{\omega\mu_0 a}{4\pi}[2\cos\phi_{n1}\cos\phi_{m1}-\sin\phi_{n1}\sin\phi_{m1})]\times\left[\frac{1}{r^3}+\frac{1}{r_i^3}\right]. \quad (5)$$

For receiver 2, similar steps can be carried, while noting that $\phi_{n2}=\phi_{n1}+\pi/2$, which allows a re-write of the total voltage:

$$V_{T(m1\to n2)} = -j\frac{\omega\mu_0 a}{4\pi}[-2\cos\phi_{m1}\sin\phi_{n1}-\cos\phi_{n1}\sin\phi_{m1})]\times\left[\frac{1}{r^3}+\frac{1}{r_i^3}\right]. \quad (6)$$

Now upon taking the squares of the voltage descriptions and summing both receiver contributions, it can be found that:

$$F_{m1} = \begin{Bmatrix} V_{T(m1\to n1)}^2 \\ +V_{T(m1\to n2)}^2 \end{Bmatrix} = c^2\frac{5+3\cos(2\phi_{m1})}{2}\left[\frac{1}{r^3}+\frac{1}{r_i^3}\right]^2, \quad (7)$$

where $c=-j\omega\mu_o\alpha/4\pi$ is a constant. A point to be noted here is that regardless of the orientation of $\hat{m}_1$, the orientation of the receivers do not have an effect in Eq. (7). By taking similar steps, the counterpart to Eq. (7) that describes the case of the transmitter $\hat{m}_2$ can be found:

$$F_{m2} = \left\{ \begin{array}{c} V^2_{T(m2 \to n1)} \\ +V^2_{T(m2 \to n2)} \end{array} \right\} = c^2 \frac{5 - 3\cos(2\phi_{m1})}{2} \left[ \frac{1}{r^3} + \frac{1}{r_i^3} \right]^2, \quad (8)$$

where the change $\phi_{m2} = \phi_{m1} + \pi/2$ was made so that both Eqs. (7) and (8) have the same variables. Finally, by taking the direct sum of Eqs. (7) and (8), a function can be found that is only range dependent, and invariant of the orientation of the transmitter or receiver:

$$F_r = F_{m1} + F_{m2} = b \left[ \frac{1}{r^3} + \frac{1}{r_i^3} \right]^2, \quad (9)$$

where $b=5c^2$ is a constant determined through calibrations. In practice, $F_r$ is obtained by summing the signal power measured at both receivers due to both transmitters. The model for inverting range involves an optimization for ground conductivity as described in Ref. [3] to obtain a model of the range dependence of the geometric distance function $(1/r^3+1/r_i^3)$, which can be numerically inverted. Practical implementation will be described in the following sections.

To obtain a function that is only dependent on orientation, the ratio of $F_{m2}$ to $F_{m1}$ can be taken:

$$F_{\phi m} = \frac{F_{m2}}{F_{m1}} = \frac{5 - 3\cos(2\phi_{m1})}{5 + 3\cos(2\phi_{m1})}, \quad (10)$$

where the range dependence is automatically removed through cancellation. Solving Eq. (10) for the orientation of the transmitter as a function of $F_{\phi m}$, it is possible to obtain:

$$\phi_{m1} = \frac{1}{2} \cos^{-1} \left[ \frac{5 - 5 \times F_{\phi m}}{3 \times F_{\phi m} + 3} \right], \quad (11)$$

where $\phi_{m2}$ can be easily obtained if needed by noting that $\phi_{m2} = \phi_{m1} + \pi/2$. In practice, $F_{\phi m}$ is obtained by first summing the power of both tones in one receiver, and dividing this value by the sum of power of both tones in the second receiver. This implementation will be described in the following sections.

Figure 2:
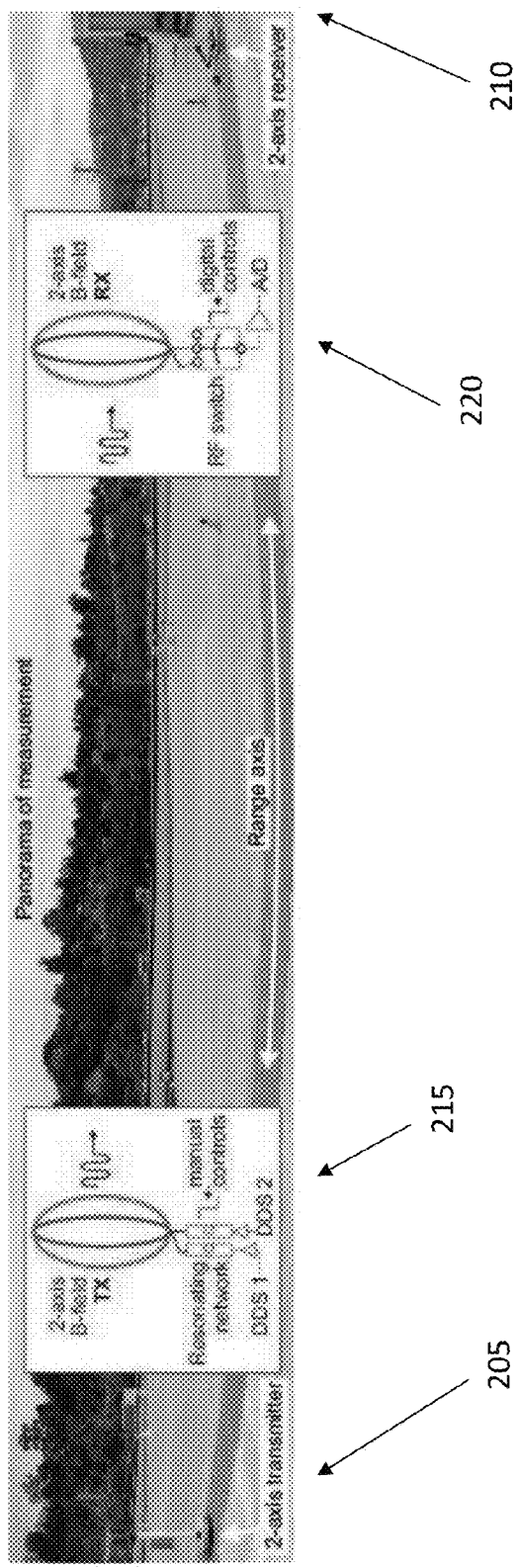
FIG. 2 illustrates a 2-axis transmitter and receiver system during range and orientation experiments on a building rooftop.

FIG. 2 illustrates a two-axis transmitter (205) and receiver (210) system during range and orientation experiments on a building rooftop. Inserts (215, 220) show the related system block diagrams.

To study the accuracy of the decoupled range and orientation solutions, both transmitter and receiver were developed to have two orthogonal axes, and the range and orientation of the mobile transmitter was varied relative to the fixed receiver system. The experiment was conducted on the rooftop of a long building at the Jet Propulsion Laboratory campus. The setup is shown in FIG. 2. A tape measure and orientation table were used to provide range and orientation ground truth for error analysis. In this exemplary system, each axis of the transmitter and receiver consisted of about 50-turns of 28 AWG magnet wire wound in a closely spaced configuration around a square outline with a side of about 20 cm. Both transmit and receive coils were co-located at a height of about 1.5 m. The inserts of FIG. 2 (215, 220) shows the transmitter and receiver block diagrams. Two direct digital synthesized (DDS) sources are used to generate tones at 198 kHz and 232 kHz each. The output tone of each DDS is amplified using a class-AB amplifier design consisting of a LM386 audio amplifier chip-set from Texas Instruments (TI). The output of each amplifier drives a resonant capacitor network and coil designed to resonate at the center frequency of the tones. The emitted magnetic field of transmitter coil-1 at about 198 kHz, and of coil-2 at about 232 kHz, induces a current in both coils of the receiver. To permit detection of both tones in each coil and to maintain simplicity in the RF design, a digitally controlled switch circuitry was used to switch between coils of the receiver. The output of the switch was amplified using a two-stage Norton amplifier (Z10043A and Z10047A) from Clifton Laboratories. The amplified signals were digitized using a ±0.1 V, 16-bit 2MS/s analog-to-digital convertor (ADC) within the USB-6361 X-Series Data Acquisition system from National Instruments. The USB-6361 X-Series Data Acquisition was also used to set the digital state of the RF switch. Data was streamed to a PC and processed in Matlab by Mathworks. Unknown gain/losses in each channel of the transmitter and receiver were measured through coupling measurements at very short ranges of about 2 m, to reduce effects of secondary fields that would distort the calibrations.

The digital time-domain signals of about 0.1 s in length captured by the ADC were sent to the PC and converted using a Fast-Fourier Transform (FFT) algorithm into the frequency domain. The peak power found close to 198 kHz and 232 kHz were captured and calibrated using gain measurements described previously. By selecting the switch digitally, the tones were captured in alternating fashion between both receive coils. The measurements during one round contained power of each tone at both receiver coils. The captured data from the two receiver coils were distinguished by digital switch selection. Since power varies linearly with the voltage squared, all 2×2 or 4 power measurements were summed within each round. The total summed power has the form of $F_r$ in Eq. (9), but requires a calibration to remove the unknown gain, b. This is done through a measurement at 18.3 m (60 ft). To solve for the ground conductivity and a within r a measurement of $F_r$ was repeated at 10 m and used to minimize for a, from which a ground conductivity of 0.45 S/m was found for the rooftop. Next, a model of the geometric range function squared $([1/r^3+1/r_i^3]^2)$ was obtained numerically as a function of radial distance, ρ. The measured total power after calibrating $F_r$ was then inverted based on this model to obtain the radial range, ρ, between the transmitter and receiver.

To obtain the orientation of the transmitter, the total summed power of both tones at one receiver was divided by the total summed power of both tones at the second receiver. This ratio had the exact form of $F_{\phi m}$ in Eq. (10) and did not require any further calibration. Using Eq. (11), the ratio given by $F_{\phi m}$ was converted into the orientation of the transmitter.

The above system and methodology are intended as an example. Other systems with different configurations may also be employed.

Figure 3:
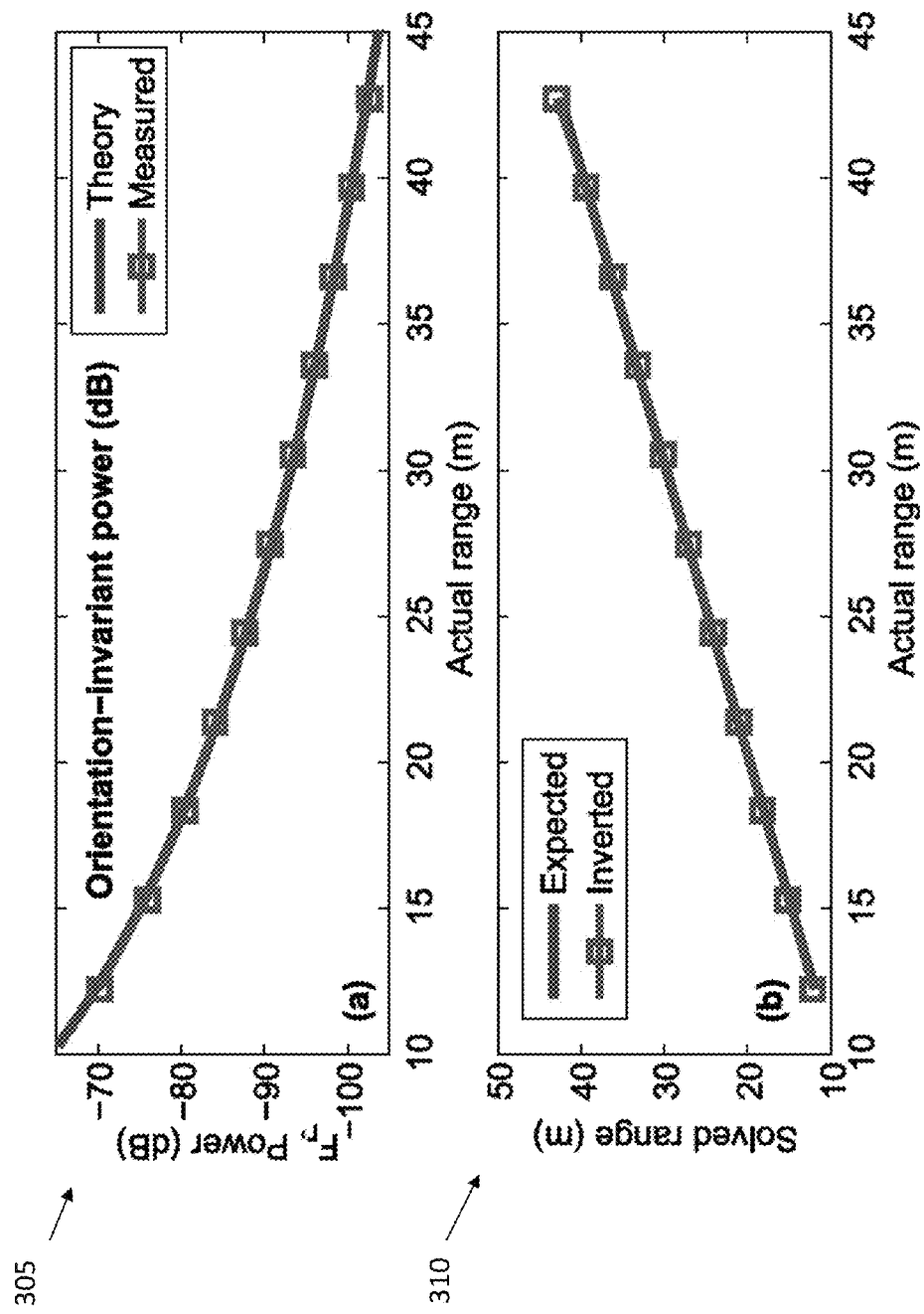
FIG. 3 illustrates measurements of the orientation-invariant range function compared to theory.

FIG. 3 illustrates measurements of the orientation-invariant range function compared to theory. The resulting inverted range is also compared to ground truth. As visible in FIG. 3, the theoretical prediction and experimental measurements are very close.

To study the orientation-invariant ranging accuracy, the radial range, ρ, of the transmitter was varied from 12.2 m (40 ft) to 42.7 m (140 ft) at steps of 10 ft (3.048 m), while attempting to maintain an orientation of $\phi_{m1}=90°$. The total power of the orientation-invariant range function, $F_r$, is shown in FIG. 3 (305) to match well with the geometric range function squared ($[1/r^3+1/r_i^3]^2$) from complex image theory. The solution is numerically inverted to obtain the range, which is compared to the expected ground truth range in FIG. 3 (310).

Figure 4:
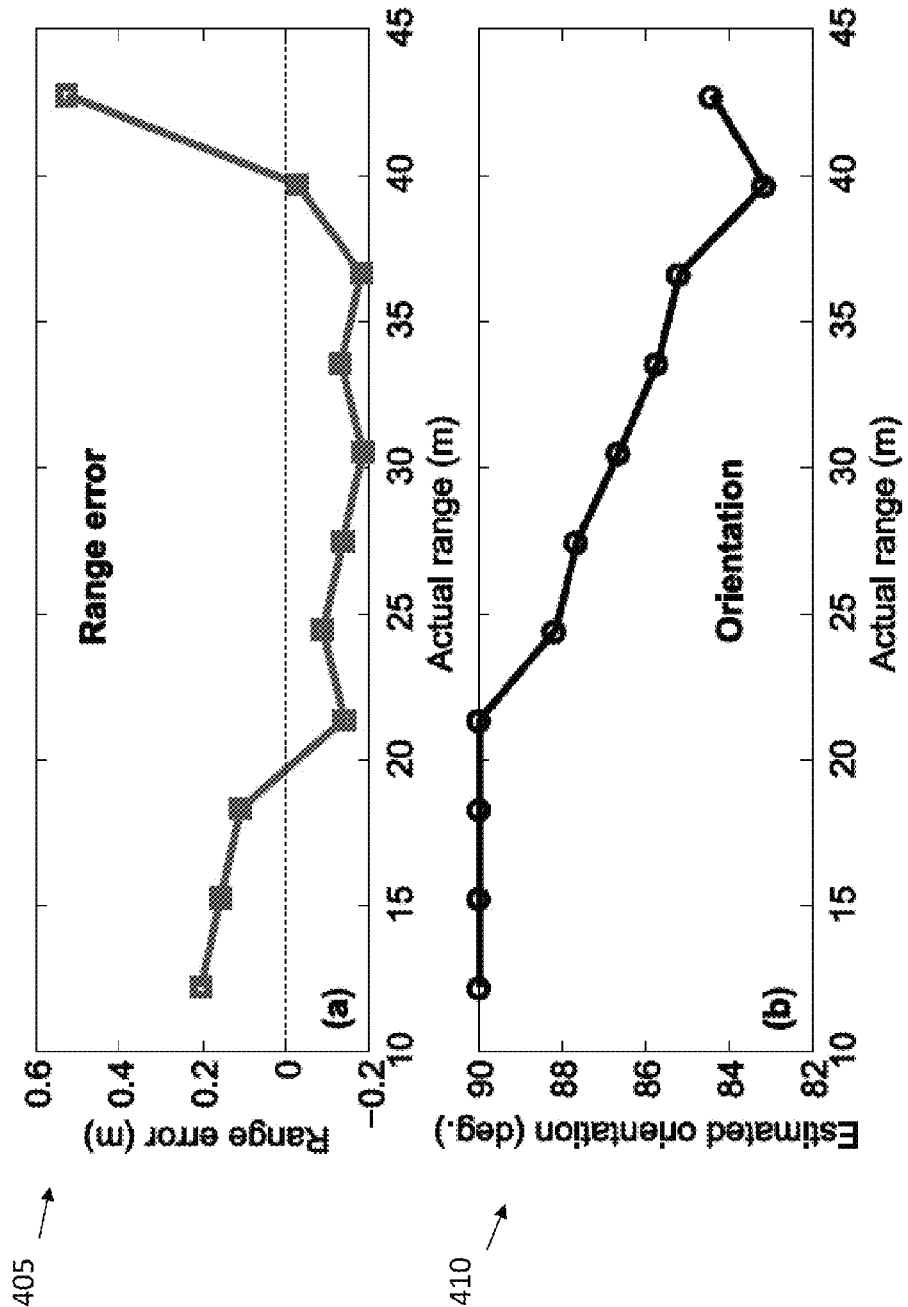
FIG. 4 illustrates the error in range and orientation solution.

Range error and orientation inversion for measurements with variation in range but with fixed orientation are illustrated in FIG. 4. The error in range estimation shown in FIG. 4 (405) was below 0.2 m for distances up to about over 40 m. The orientation solutions for the range measurements described here varied by about 7° from the expected value of 90°, as visible in FIG. 4 (410).

Figure 5:
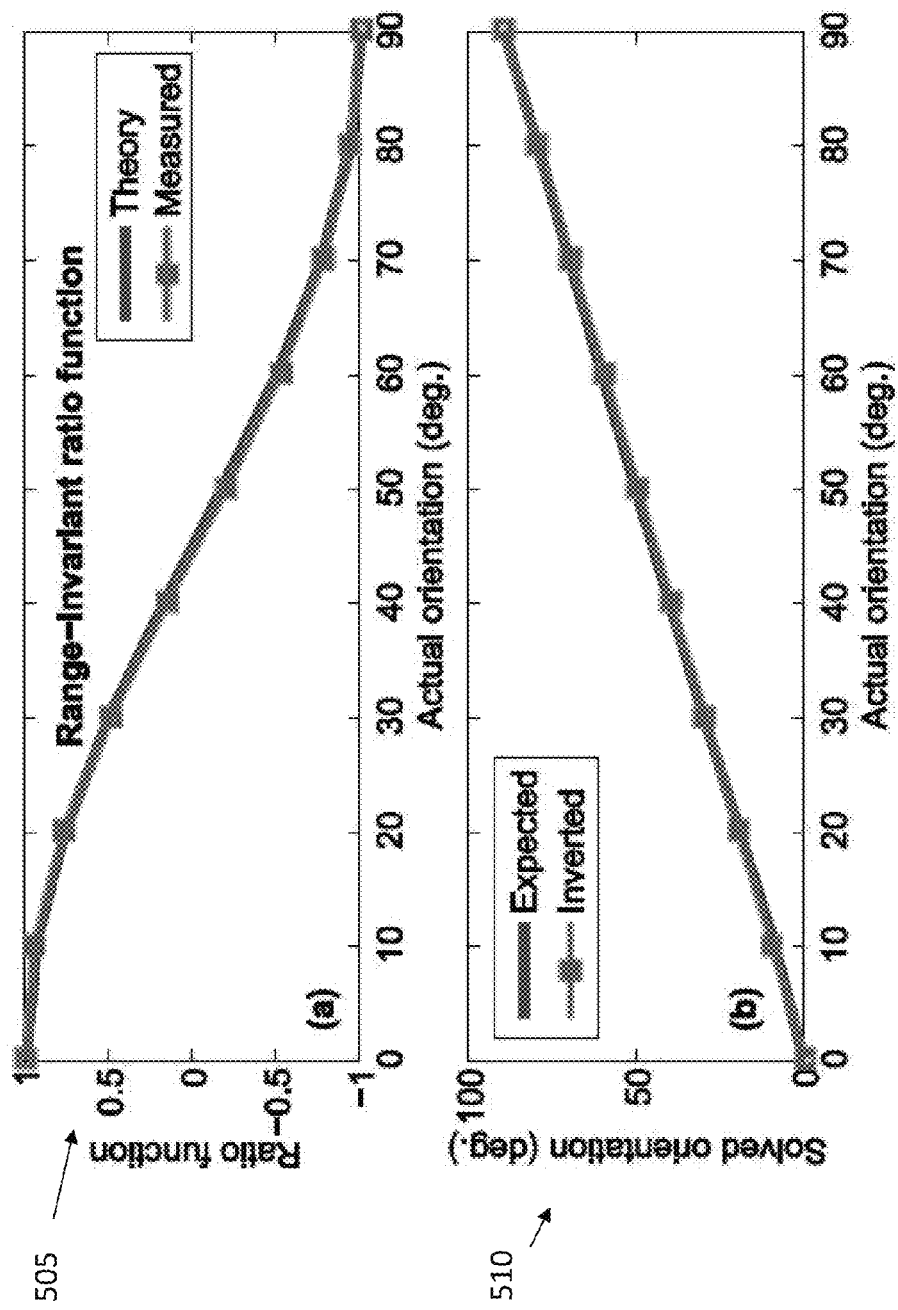
FIG. 5 illustrates measurements of the range-invariant orientation function compared to theory.
Figure 6:
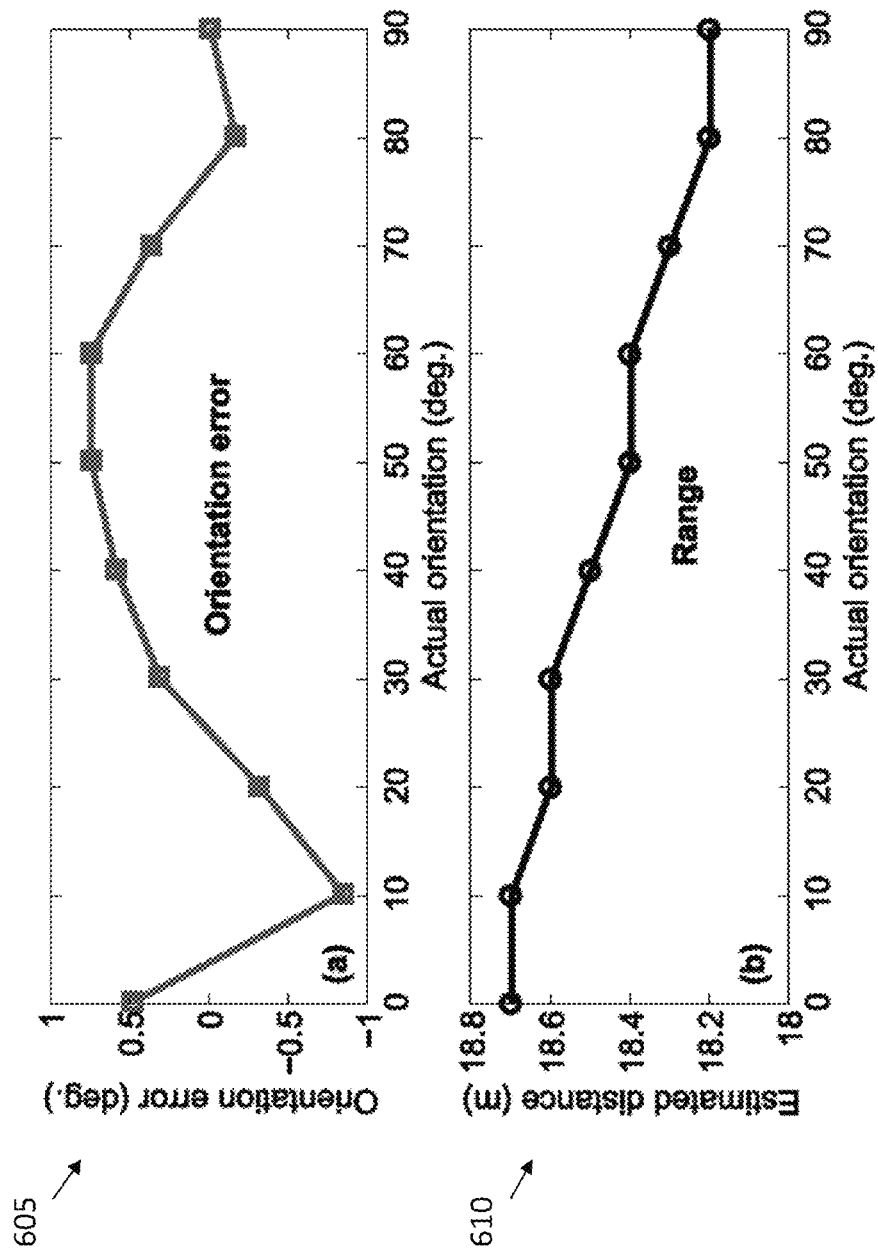
FIG. 6 illustrates the orientation error and range inversion for measurements with variation in orientation at a fixed range.

FIG. 5 illustrates measurements of the range-invariant orientation function compared to theory. The resulting inverted orientation is also compared to ground truth. To study range-invariant orientation accuracy, the orientation, $\phi_{m1}$, of the transmitter was varied from 0° to 90° at steps of 10°, at a range of 18.3 m (60 ft). The measured range-invariant orientation ratio, $F_{\phi m}$, is shown in FIG. 5 (505) to match well with theory. The solution for the orientation, $\phi_{m1}$, is found using Eq. (11), which is compared to the expected ground truth orientation in FIG. 5 (510). The orientation error, shown in FIG. 6 (605), was below 1° for all orientations. The range solutions for the orientation measurements described here varied by up to 0.4 m from the expected value of 18.3 m (610).

From the experiment and calculations described above, a long-range magnetoquasistatic positioning concept was developed that permits the decoupling of range and orientation in the coupling theory. Therefore, the technique described above using magnetoquasistatic fields has been shown to enable accurate ranging in non-line-of-sight environments. The system, in the embodiments above, was optimized for measurements close to the 2D xy-plane. Measurements showed peak orientation-invariant ranging errors of 0.2-0.4 m for a range of up to over 40 m. The peak range-invariant orientation errors found were 1-7°.

In the following, the technique described above using magnetoquasistatic fields is expanded to include decoupling of azimuthal direction of a mobile device. The results are azimuthal direction sensing for long-range magnetoquasistatic systems with a peak error of about 6°, independent and invariant of the range or orientation of the mobile device. In the following, two-dimensional (2D) positioning is demonstrated by combining the decoupled range and azimuth-direction solutions.

As discussed above, the non-line-of-sight (NLoS) positioning problem is important in both civilian and military applications. Existing techniques that utilize high-frequency propagating radio waves suffer in NLoS use (for example, see Refs. [4, 6-7]).

Magnetoquasistatic (MQS) fields are weakly perturbed by lossy-dielectrics, and thus beneficial when used in NLoS positioning. Direction finding systems require to be progressively moved closer to the transmitter, and therefore cannot provide long range positioning, see Ref. [10]. Short-range MQS systems use a frequency of a few kilohertz to avoid ground effects, see Refs. [8, 9]. However, the use of very low frequency and increased ground effects with range, limits their maximum operation range to a few meters. To enable long-range NLoS sensing, a MQS technique was developed to account for ground effects and by using a higher-frequency (300-400 kHz) to obtain a range of up to about 50 m, see Ref. [3]. The long-range MQS technique enabled ranging with errors of 0.12-0.7 m for ranges up to 40 m, see Ref [3], and was not sensitive to the LoS blockage, see Ref. [1].

However, due to the non-linear position-orientation coupling and ground effects, the technique can have some limitations when extended to 2D or 3D, resulting in errors which are dependent on positions, orientations, and the non-linear solution convergence, see Ref. [2].

As described above in the present disclosure, and as seen from Ref [11], a long-range MQS technique has been described to decouple the range and orientation of the device to be located. The technique can account for ground effects, obtaining decoupled solutions with low error over long ranges. This section extends the technique to provide decoupled azimuth-direction sensing, which enables 2D decoupled positioning of the MQS mobile device using a single receiver system with orthogonal co-located coils.

Figure 7:
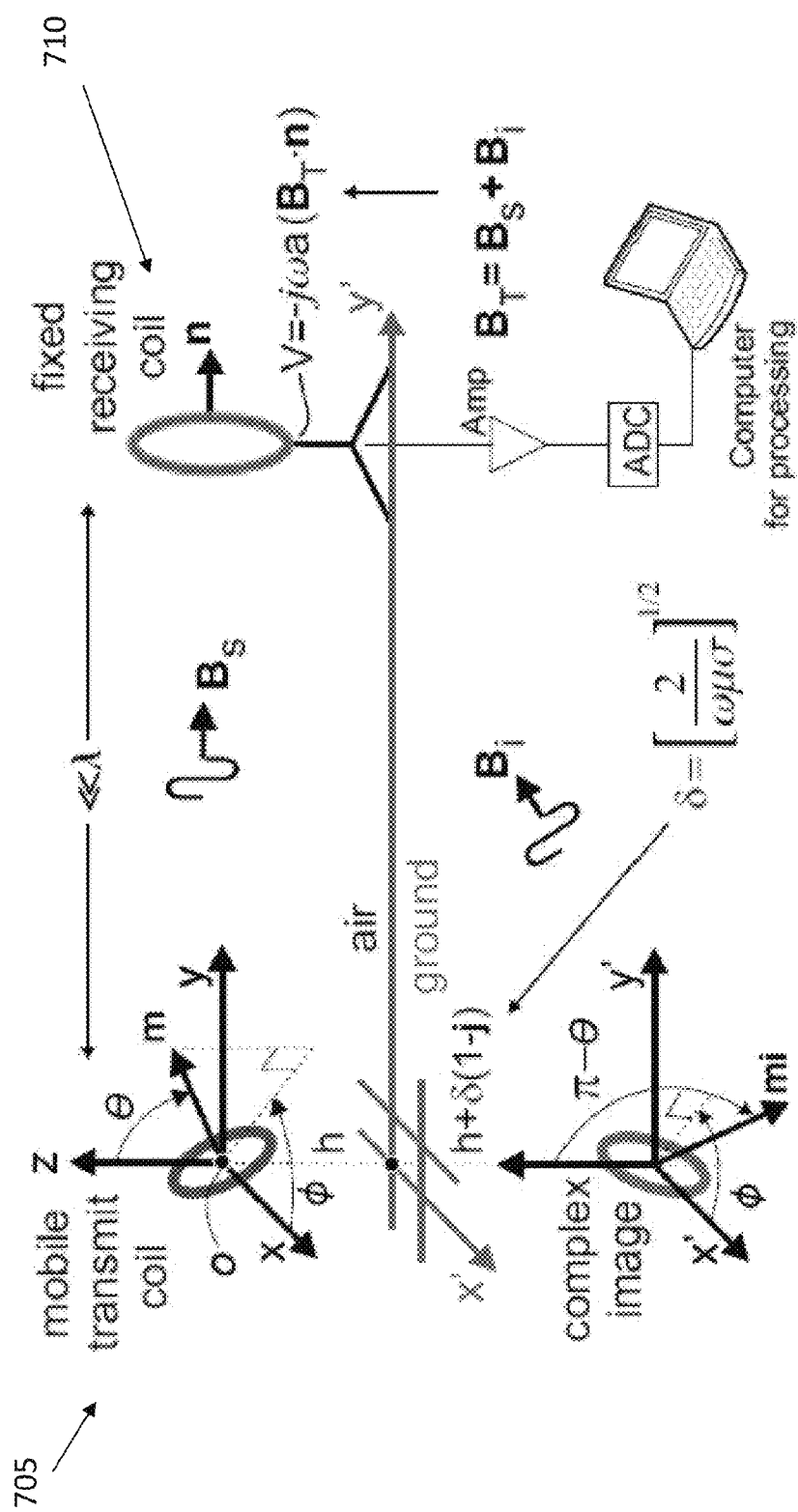
FIG. 7 illustrates transmit-receive coil coupling.

FIG. 7 illustrates transmit-receive coil coupling. The secondary fields due to the eddy-currents are modeled using complex image theory, see Ref. [3].

As described above and in Ref. [11], the voltage measured at a receiving coil due to a quasistatic magnetic source above ground is due to the source ($\vec{B}_s$) and image ($\vec{B}_i$) fields as shown in FIG. 7, and is given by Eq. (2). In FIG. 7, the system comprises a mobile transmit coil (705) and a fixed receive coil (710).

As detailed above, the total voltage expression of Eq. (2) can be simplified to give Eq. (4), where z is the receiver height above the xy-plane formed at the origin of the transmitter, $\rho$ is the cylindrical radial range, and $\delta$ is the skin depth of penetration in the ground. The key assumption required to derive (2) is that at short ranges only the source field is significant, but $\rho/r \approx 1$, whereas at long ranges, both source and image fields are important, but $\rho/r_i \to 1$.

Figure 8:
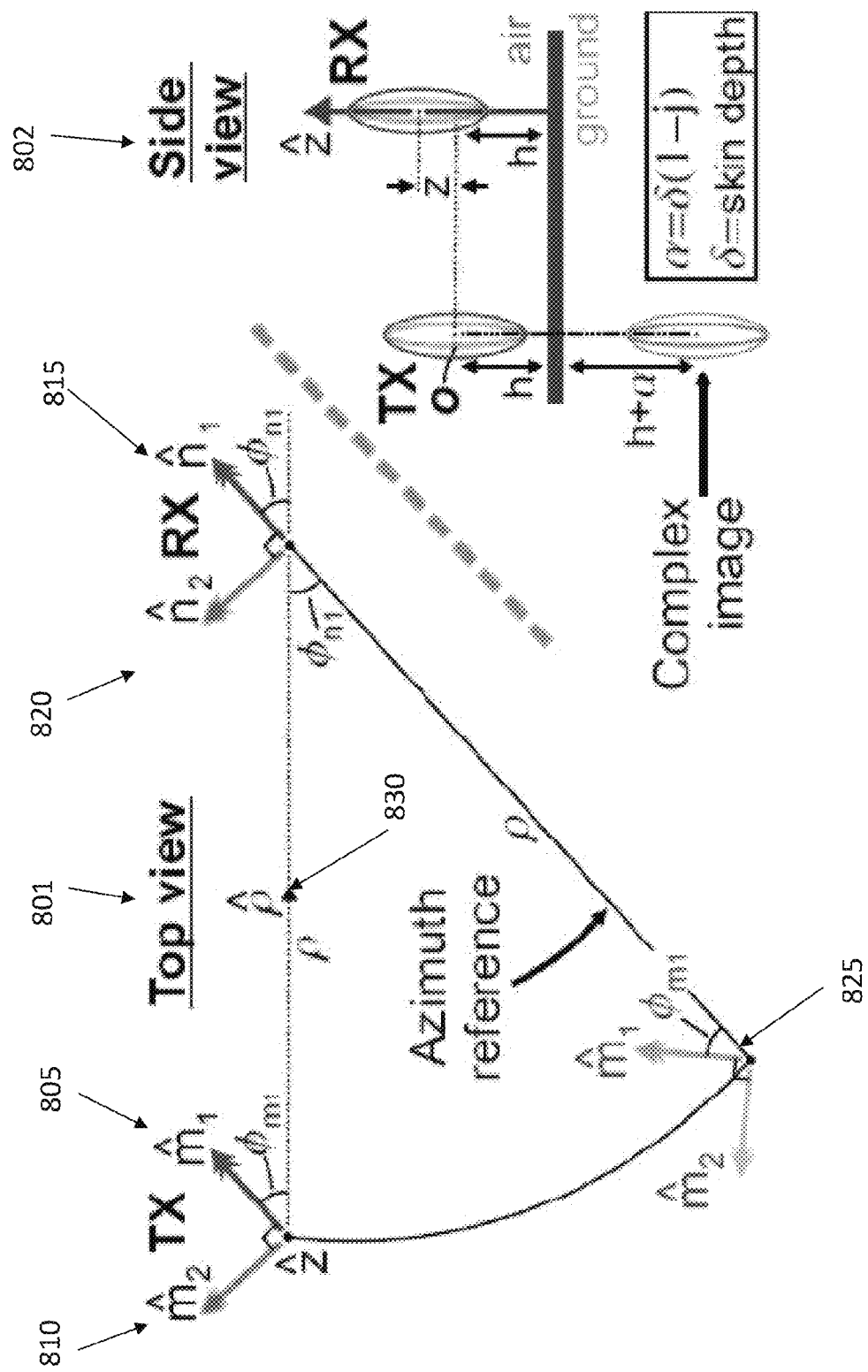
FIG. 8 illustrates a two-axis orthogonal transmit and receive system.

To enable 2D positioning using a single receiver and transmitter system, a two-axis orthogonal transmit and receive system are employed, as shown in FIG. 8. FIG. 8 illustrates a top (501) and side (802) view illustration the two-axis transmitter and receiver system. The transmitter is permitted to have an arbitrary azimuth-direction (($\phi_{n1}$)$_1$) relative to a reference azimuth-angle. The two-axis transmitter has horizontal magnetic moments denoted by $\hat{m}_1$ (805) and $\hat{m}_2$ (810) whereas the two-axis receiver has horizontal magnetic moments denoted by $\hat{n}_1$ (815) and $\hat{n}_2$ (820). The orientation of the transmitter, $\phi_{m1}$ (825), is noted to be relative to the radial vector direction, $\hat{\rho}$ (830). The azimuth-direction of the transmitter is defined relative to the azimuth angle of the receiver $\hat{n}_1$, and the angle is given by $\phi_{n1}$ as shown in FIG. 8.

It can be noted that Eq. (4) exhibits a symmetry between the transmitter and receiver moments, $\hat{m}$ and $\hat{n}$. To derive the decoupled transmitter orientation, as described above and in Ref. [11], a transmitter-centric approach was used, where the transmitter orientation, $\phi_{m1}$, was found from the ratio of $F_{\phi m}=F_{m2}/F_{m1}$:

$$\phi_{m1} = \frac{1}{2}\cos^{-1}\left[\frac{5-5\times\frac{F_{m2}}{F_{m1}}}{3\times\frac{F_{m2}}{F_{m1}}+3}\right], \frac{F_{m2}}{F_{m1}} = \frac{\sum_k V^2_{T(m2\to nk)}}{\sum_k V^2_{T(m1\to nk)}}. \quad (12)$$

Here, the squared voltage from transmitter 2 measured at both receivers (k=1,2) is summed to give $F_{m2}=V_{T(m2\to n1)}^2 + V_{T(m2\to n2)}^2$, and divided by similar contributions from transmitter 1, $F_{m1}=V_{T(m1\to n2)}^2+V_{T(m1\to n2)}^2$.

To approach a solution for the azimuth-direction of the transmitter, $\phi_{n1}$, a receiver-centric solution is derived instead. Simplifying Eq. (4) for $\hat{\rho} \cdot \hat{m}_1 = \cos \phi_{m1}$, $\hat{\rho} \cdot \hat{n}_1 = \cos \phi_{n1}$, and $\hat{m}_1 \cdot \hat{n}_1 = \cos(\phi_{m1} - \phi_{n1}) = \cos \phi_{n1} \cos \phi_{m1} \circ \sin \phi_{m1}$, the voltage at receiver 1 is found, due to contributions from transmitter 1, and by using similar steps, from transmitter 2:

$$V_{T(n1 \leftarrow m2)} = -j \frac{\omega \mu_0 a}{4\pi} [-2\cos\phi_{n1}\sin\phi_{m1} - \cos\phi_{m1}\sin\phi_{n1})] \times \left[ \frac{1}{r^3} + \frac{1}{r_i^3} \right], \quad (13)$$

where $\phi_{m2} = \phi_{m1} + \pi/2$ was used to derive $V_{T(n1 \leftarrow m2)}$ to keep $\phi_{m1}$ in both equations. Taking the sum of squares of Eq. (13), the receiver-centric version of the solutions at receiver 1 can be found:

$$F_{n1} = \left\{ \begin{array}{c} V_{T(n1 \leftarrow m1)}^2 \\ + V_{T(n1 \leftarrow m2)}^2 \end{array} \right\} = c^2 \frac{5 + 3\cos(2\phi_{n1})}{2} \left[ \frac{1}{r^3} + \frac{1}{r_i^3} \right]^2, \quad (14)$$

where $c = -j\omega\mu_o\alpha/4\pi$ is a constant. In contrast to $F_{mi}$ in Ref [11] and in the previous embodiment described above in the present disclosure, $F_{n1}$ is only a function of receiver 1's orientation, and is invariant of the transmitter orientations. Following similar steps, the contributions at receiver 2 can be found:

$$F_{n2} = \left\{ \begin{array}{c} V_{T(n2 \leftarrow m1)}^2 \\ + V_{T(n2 \leftarrow m2)}^2 \end{array} \right\} = c^2 \frac{5 - 3\cos(2\phi_{n1})}{2} \left[ \frac{1}{r^3} + \frac{1}{r_i^3} \right]^2. \quad (15)$$

The solutions in Eqs. (14) and (15) are the receiver-centric coupled equations which are invariant of the transmitter orientations, but dependent on range. To further remove range dependence, we take the ratio of Eq. (15) to Eq. (14) to find the receiver-centric counterpart to $F_{\phi m}$ described above for a previous embodiment, as well as in Ref. [11]:

$$F_{\phi n} = \frac{F_{n2}}{F_{n1}} = \frac{5 - 3\cos(2\phi_{n1})}{5 + 3\cos(2\phi_{n1})}. \quad (16)$$

Through a direct inversion of Eq. (16), it is possible to find the orientation of receiver 1, $\phi_{n1}$, which is the azimuth-direction of the transmitter if the receiver is in a fixed non-rotating configuration:

$$\phi_{n1} = \frac{1}{2} \cos^{-1} \left[ \frac{5 - 5 \times F_{\phi n}}{3 \times F_{\phi n} + 3} \right]. \quad (17)$$

To solve for the azimuth-direction of the transmitter using Eq. (17), it is necessary to compute $F_{\phi n} = F_{n2}/F_{n1}$. In practice, $F_{n1}$ and $F_{n2}$ is obtained by summing the calibrated power due to both transmitters at receiver 1 and 2, respectively.

Once the decoupled azimuth-direction of the transmitter is found, its 2D location is known in cylindrical coordinates from the azimuth-direction combined with the decoupled range solutions, $\rho$, as described above in the present disclosure, and in Ref. [11]. The inverted location of the transmitter, relative to the receiver location, can also be readily converted into Cartesian coordinates using the coordinate conversions $x = \rho \cos \phi_{n1}$ and $y = \rho \sin \phi_{n1}$.

Figure 9:
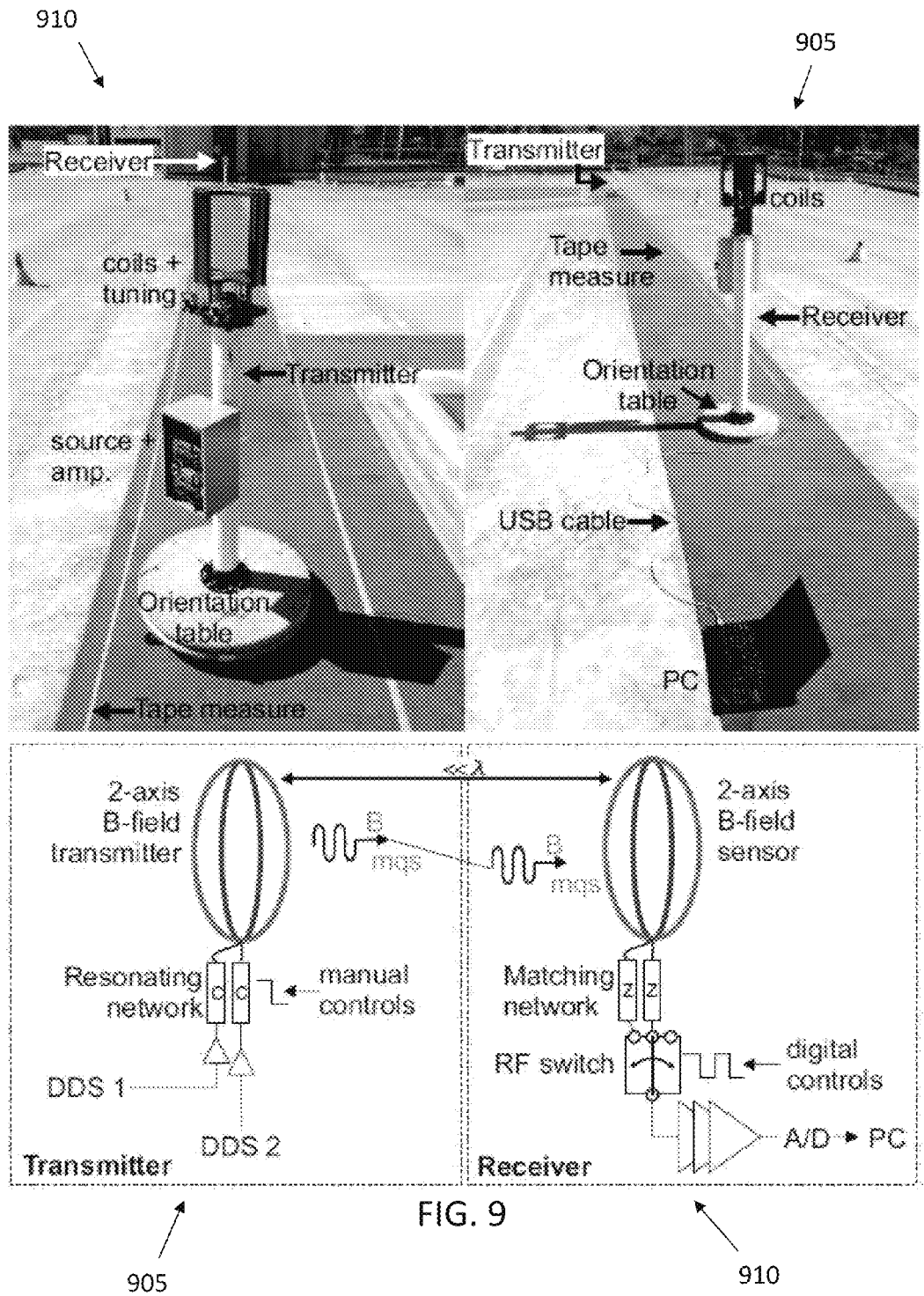
FIG. 9 illustrates a transmit and receive system for experimental setups.

To study the accuracy of the decoupled azimuth-direction sensing, a two-axis orthogonal transmit and receive system was developed as shown in FIG. 9, with rotation-tables at their bases to allow for rotations. At the transmitter (905), two direct digital synthesized (DDS) sources were used with amplifiers, and fed to resonant coils for increased signal-to-noise. The field transmitted by each axis of the transmitter was a tone at 198 kHz and 232 kHz, respectively. Both tones are detected at each receiver (910) coil. A switch is used to selectively sense the signal at the receiver coils, which is then amplified and digitized. The setup is described more in details in the present disclosure, above.

To simplify the experiments for azimuth-direction sensing of the transmitter, the transmitter's orientation, $\phi_{m1}$, its radial range, $\rho$, and its location a, are fixed, and the orientation of the receiver, $\phi_{n1}$ is varied. As described previously and illustrated in FIG. 8, the orientation $\phi_{n1}$ describes the angle between $\hat{\rho}$ and $\hat{n}_1$, which also describes the azimuth-direction of the transmitter relative to the azimuth-reference ($\hat{\rho}$ when aligned to $\hat{n}_1$ direction) if the receiver's position and orientation is fixed. To characterize the technique and inversion results, some measurements were taken and compared to the theoretical predictions.

Figure 10:
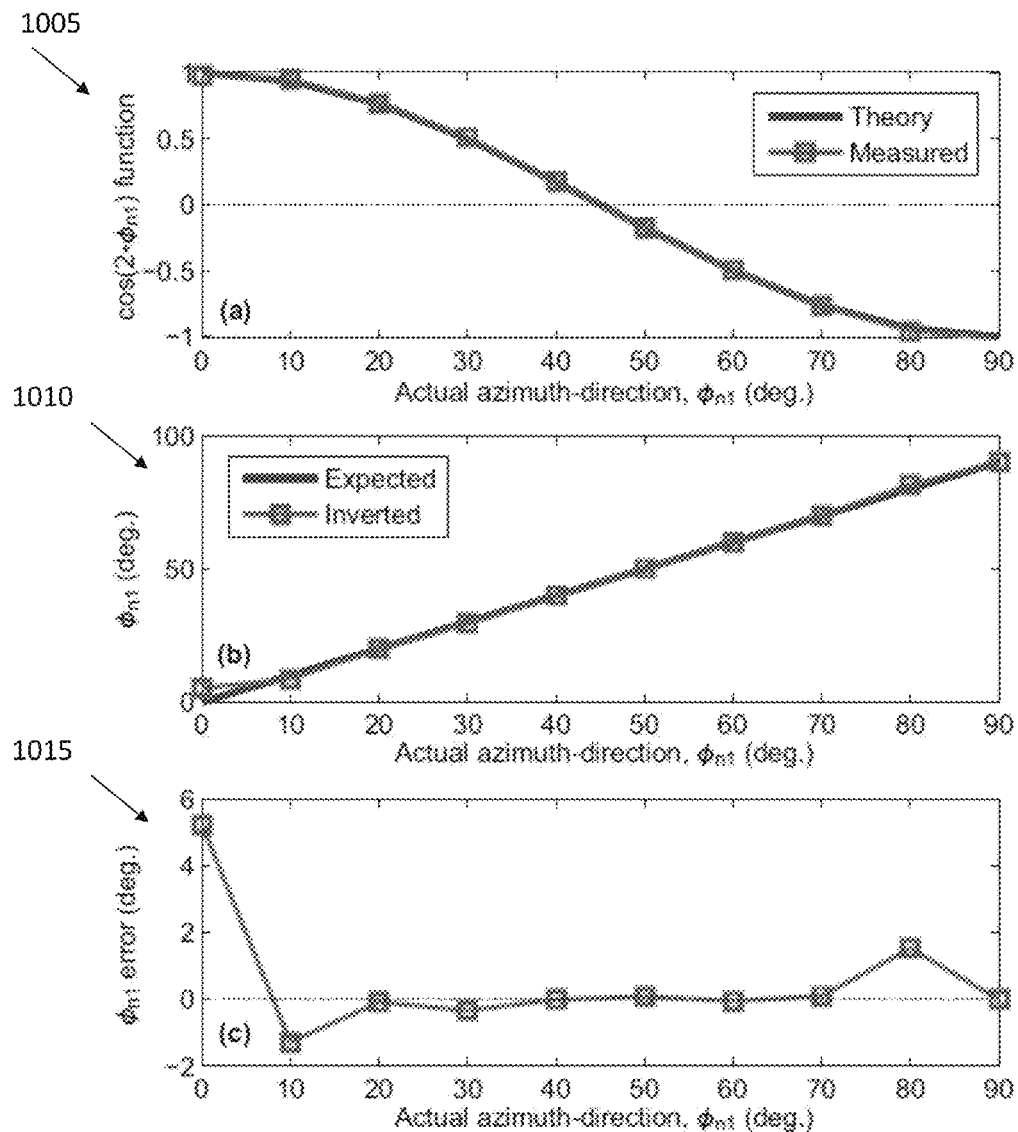
FIGS. 10-13 illustrate measurements of the azimuth-direction function compared to theory for variation in azimuth-direction.

First, the azimuth-direction sensing accuracy for the transmitter at a fix range, $\rho$, and orientation, $\phi_{m1}$, were studied. The transmitter was placed at a radial range of 10 m from the receiver system. The locations of both the transmitter and receiver were fixed, and the transmitter's orientation, $\phi_{m1}$, was set to 0°. To simulate the azimuth-direction, the receiver's orientation, $\phi_{n1}$, was rotated from 0° to 90° at steps of 10°. The measured $F_{\phi n}$ at each measurement step is obtained by summing the calibrated measured power from both transmitters at receiver 2, and dividing this by the summed powers of both transmitters measured at receiver 1, as described by Eqs. (14)-(16). The measured result for $F_{\phi n}$ is compared to the expected theoretical value in FIG. 10 (1005). FIG. 10 illustrates measurements of the azimuth-direction function compared to theory for variation in azimuth-direction of the transmitter (1005). The inverted azimuth-direction is also compared to the ground truth (1010), with the related error (1015).

Inverting the measured $F_{\phi n}$ for azimuth-direction, $\phi_{n1}$, resulted in close agreement with the expected direction referenced through the receiver rotation table (1010). The difference between the expected azimuth-direction from the rotation table and the inverted solution is the apparent azimuth-direction error. This is shown in (1015) as a function of the azimuth-direction, where the error is typically less than 2°, except when close to the 0° azimuth-direction.

Figure 11:
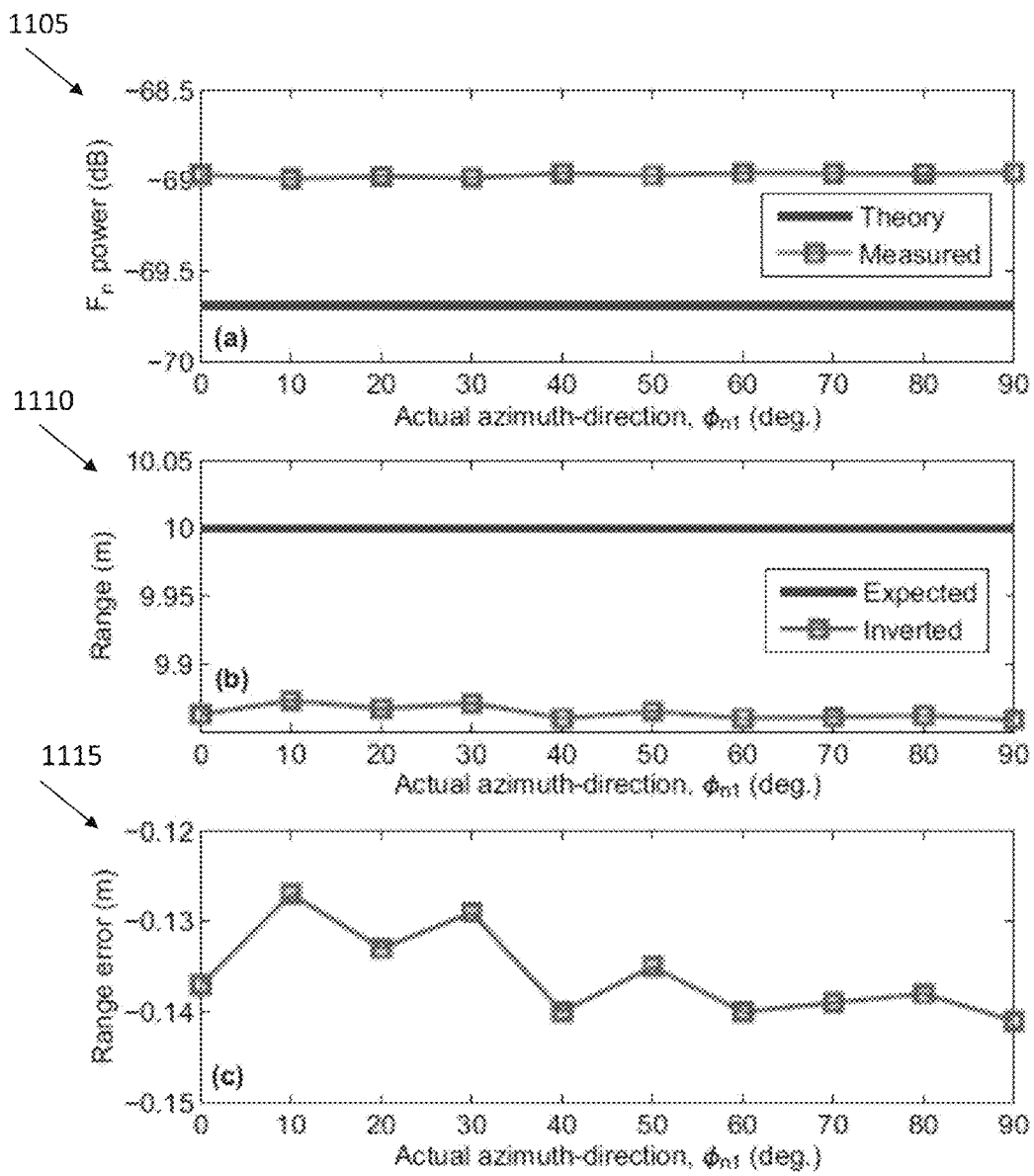

For this first experiment, the decoupled range inversion was also examined using the technique described above in the present disclosure as well as in Ref [11] to confirm that it remains invariant of the azimuth-direction. This azimuth-direction invariant ranging is important to permit a fully decoupled 2D solution. From the same data collected, the range function, $F_r$, can be calculated, as described in the present disclosure as well as in Ref [11]. A single calibration measurement was taken at 60 ft. (18.29 m) to remove unknown gains in the system, as described in the present disclosure as well as in Ref. [11]. The result for the measured $F_r$ compared to theory is shown in FIG. 11 (1105) as a function of the variation in azimuth-direction. The inverted range using the technique described above in the present disclosure as well as in Ref. [11], is found and shown in (1110), while (1115) gives the error in range. The range error is found to be less than about 14 cm.

Figure 12:
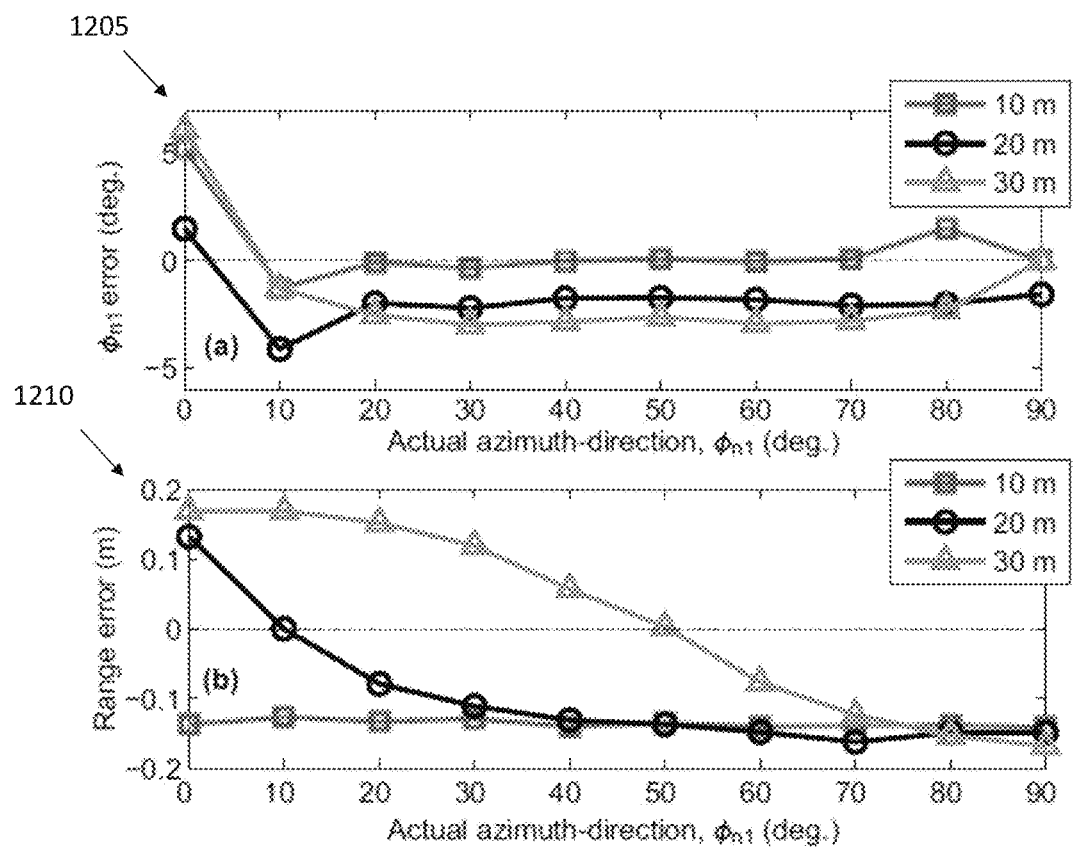

For the second experiment, the accuracy of the technique at a few different ranges was studied by locating the fixed-orientation (fixed $\phi_{m1}$) transmitter at distances, $\rho$, of 10 m, 20 m, and 30 m. The azimuth-direction is varied from 0° to 90° at steps of 10° for a transmitter range of 10 m, 20 m, and 30 m. FIG. 12 (1205) shows the resulting azimuth-direction error found using the same approach described above. The invariance of the ranging solution was also examined at the various ranges. The result for this range error is shown in (1210). The peak azimuth-direction error found was approximately 6°, whereas the peak range error found was about 17 cm.

Figure 13:
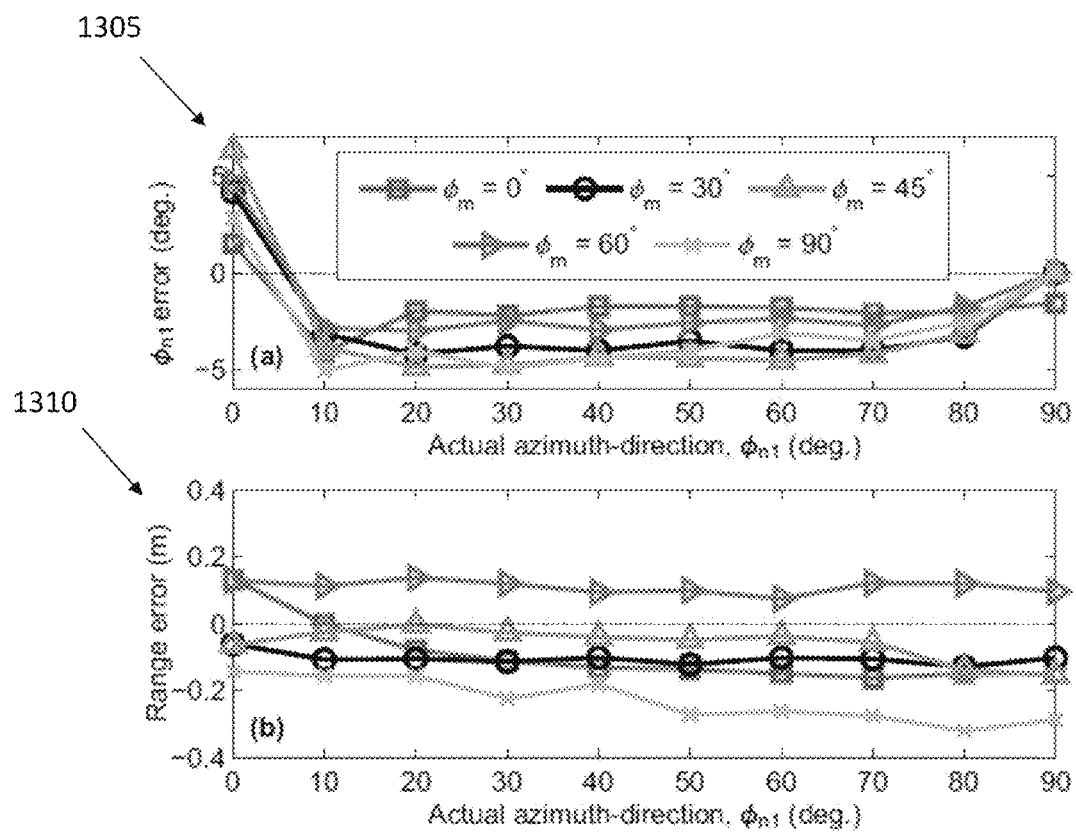

For the third experiment, the inversions due to various transmitter orientations, $\phi_{m1}$, was studied instead. In this experiment, the transmitter range, $\rho$, was fixed at 20 m, but the experiment was repeated for transmit orientations, $\phi_{m1}$, of 0°, 30°, 45°, 60°, and 90°. At each transmit orientation, $\phi_{m1}$, the azimuth-direction, $\phi_{n1}$, was varied from 0° to 90° at steps of 10°. FIG. 13 (1305) shows the result for azimuth-direction error as a function of azimuth-direction for the various transmitter orientations. The azimuth-direction error is shown to be below about 6° in all cases measured. FIG. 13 (1310) shows the result for range error as a function of azimuth-direction for the various transmitter orientations at 20 m. The peak range error was about 0.3 m.

Figure 14:
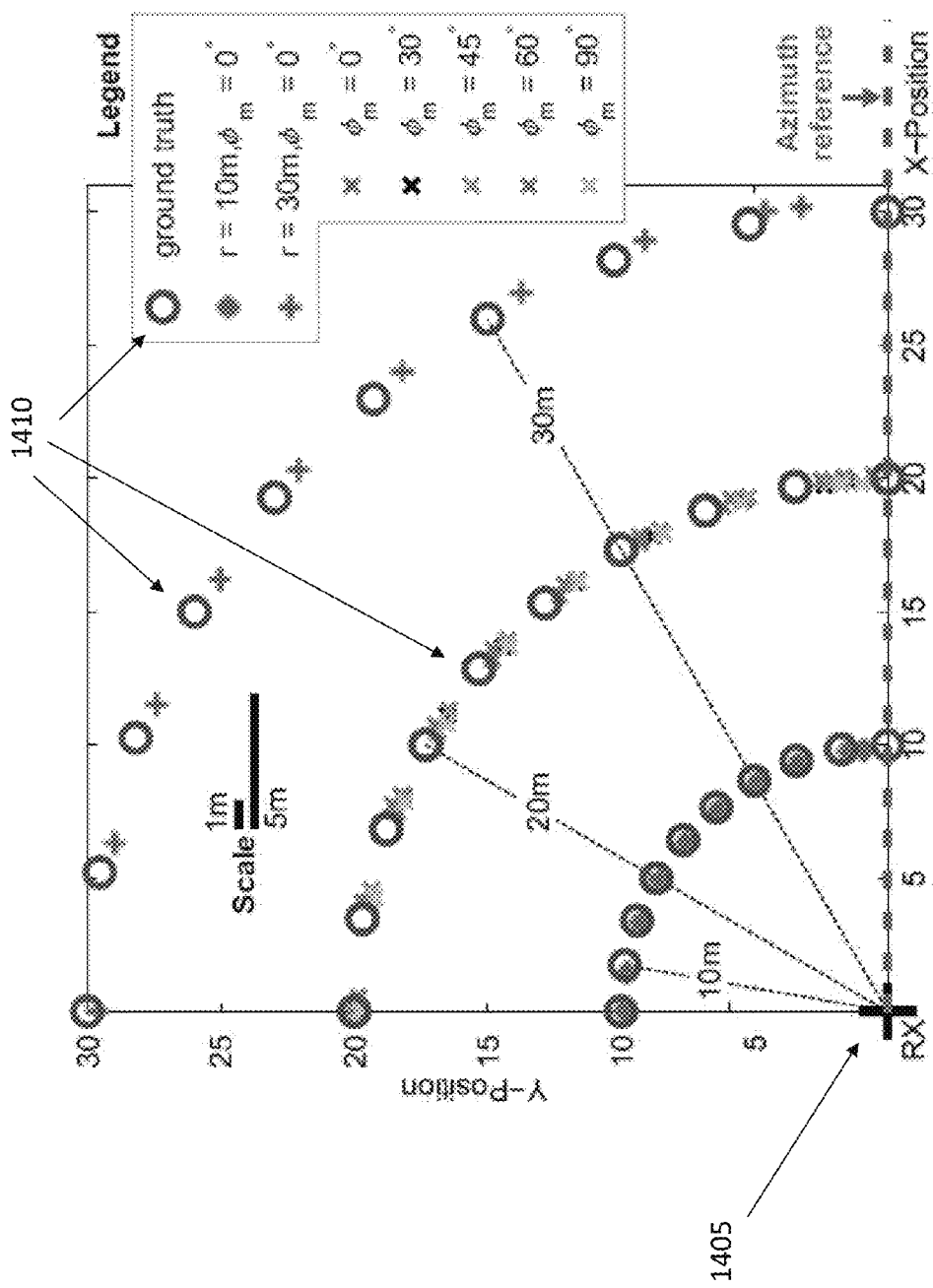
FIG. 14 illustrates a two-dimensional map of measurements at ranges of 10 m, 20 m, and 30 m, and for various transmit orientation measurements at a range of 20 m.

To provide a summary of the experimental results described above, with application to 2D location sensing, FIG. 14 shows the experimental results summarized in Cartesian coordinates. The receiver is located at the origin (1405) of the coordinate system. Circles (1410) denote the ground truth of the measurements. For measurements conducted at a range of 10 m and 30 m, the transmitter orientation, $\phi_{m1}$, was fixed at 0°. Measurements conducted at a range of 20 m included transmitter orientations, $\phi_{m1}$, of 0°, 30°, 45°, 60°, and 90°, as previously described.

As described above, in some embodiments the long-range MQS positioning technique is extended to provide decoupled azimuth-direction sensing that is invariant of the range or orientation of the transmitter, with a peak error of 6°. The range inversions were invariant of the azimuth-direction and orientation of the transmitter, with a peak error of 0.3 m. The technique enables decoupled 2D MQS positioning.

In the following section, measurements of the magnetoquasistatic coupling between a co-polarized vertical emitting and receiving coil, both located above earth, are compared to calculations using complex image theory and the exact integral solutions along a direction perpendicular to the surface normal axes of the loops. Inverting the theoretical expressions of the exact integral solution to estimate distance from measured fields resulted in an root mean square (RMS) error of 0.089 m and 0.079 m, for distances between 1.3-29.4 m and 1.3-13.5 m, which corresponds to a 21.9% and 28.4% reduction in RMS distance error, respectively, over complex image theory.

In the following, the accuracy of the magnetoquasistatic technique described above is studied using the exact integral solution to describe the exact fields of a finite loop above the earth. The magnetic field of the emitting current loop in proximity to a conducting earth can be decomposed into the primary fields of the loop and the secondary fields of the induced eddy-currents in the earth, see Ref. [3]. The total field outside the ground can be approximated by:

$$\vec{H}_c(x, y, z) = \vec{H}_l(x, y, z-h) + \vec{H}_l(x, y, -z-h-\delta(1-j)), \quad (18)$$

where c denotes the total fields due to use of complex image theory, $\delta = \sqrt{2/\mu_o \sigma \omega}$ is the skin depth, $\mu_o$ is the permeability of free-space, $\sigma$ is the bulk conductivity of the earth near the source, and $\omega$ is the angular frequency of the field emitted by the source.

Figure 15:
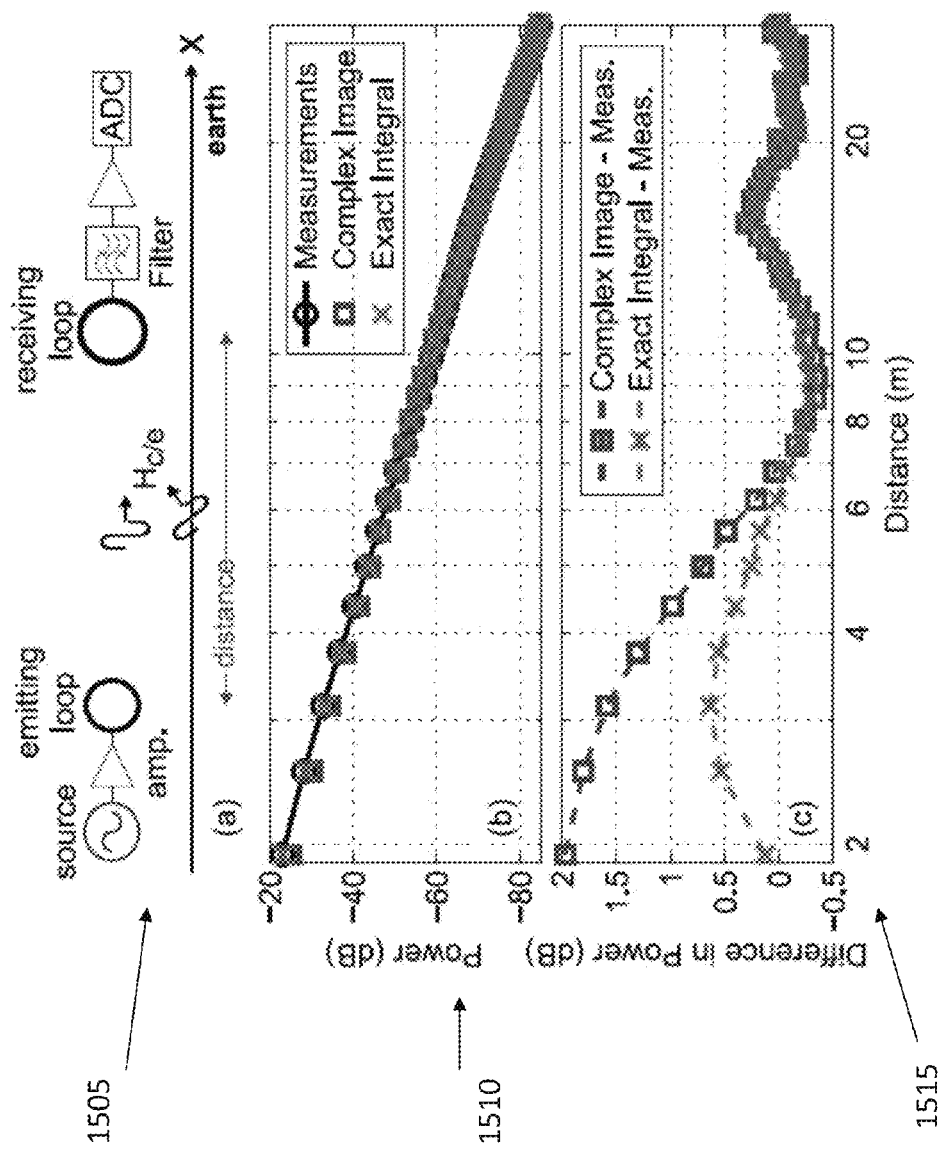
FIG. 15 illustrates a distance experiment setup and measurements.

FIG. 15 illustrates a distance experiment setup and measurement block diagram (1505). Comparison (1510) of complex image theory and the exact integral solutions to measurements. The difference in power is shown in (1515).

Due to the use of a vertical emitting loop depicted in FIG. 15 (1505), the primary source fields and the secondary eddy-current fields are co-polarized in Eq. (18), and thus summed. $\vec{H}_l$ is the field of the loop, which contains the lowest-order dipole field and higher-order loop fields (quadrupole, et cetera), and can be written in spherical coordinates using spherical harmonics:

$$\vec{H}_l = \frac{Il^2}{4r^3} \sum_{m=0}^{\infty} 2F_l(m)P_{2m+1}(\Phi)\hat{r} - F_l(m+1)P^1_{2m+1}(\Phi)\hat{\phi}, \quad (19)$$

where I is the driven current in the emitting loop, l is the radius of the emitting loop, $r = \sqrt{x^2+y^2+z^2}$ is the absolute distance from the loop to the observation point, m is the number of loop terms with m=0 representing dipole fields, P is the Legendre polynomial, $\Phi = \cos\phi$, and $\phi$ is the angle that the surface normal of the loop makes from the x-axis. The function $F_l(\zeta)$ is given by $$F_l(\zeta) = \frac{(-1)^m(2m+1)!!}{2^m \zeta!} \left(\frac{l}{r}\right)^{2m}. \quad (20)$$

Eq. (19) is valid for r>l, i.e., outside the loop, which is the region of interest. For r>>l, only the m=0 term is important, and the fields are that of a magnetic dipole, as seen Ref [3]. The theoretical description of the voltage at the terminals of the receiver shown in FIG. 15 (1505) is found using Faraday's law and is given by:

$$V_c^T = -j\omega\mu_0[\hat{n}\cdot\vec{H}_c]a, \quad (21)$$

where $\hat{n}$ is the unit vector normal to the receive loop and a is the surface area of the receive loop. Due to the use of vertical emitting and receiving loops which are co-polarized with surface normals perpendicular to the $\hat{r}$ direction, the radial component of the field in Eq. (19) does not contribute to $\hat{n}\cdot\vec{H}_c$ or the theoretical description of the voltage, $V_c^T$.

The exact integral solutions for the fields of a finite loop above earth accounts for all higher-order loop terms (all m) and the exact induced eddy-currents. Because complex image theory only approximately models the fields of the exact induced eddy-currents, it is expected that there will be some improvements in distance measurement using the exact integral solutions. The magnetic fields using the exact integral solution of a finite circular current carrying loop located above earth is given in Cartesian coordinate by (see Ref. [13]):

$$H_e = \frac{Il}{\pi} \int\int F_e\left[\frac{\alpha}{\lambda_1}T(\alpha x)T(\beta y)\hat{x} + \frac{\beta}{\lambda_1}\hat{y} + T(\beta y)\hat{z}\right]d\alpha d\beta, \quad (22)$$

where the subscript e denotes the exact fields of the emitting loop above earth, $\alpha$ and $\beta$ are integration variables which operate on each integrand from 0 to +∞, $\lambda_1 = \sqrt{\alpha^2 + \beta^2}$, $T(\zeta) = \tan(\zeta)$ and $F_e$ is given by:

$$F_e = I_1(l\beta)\left[e^{-\lambda_1|z-h|} + \frac{\lambda_2 - \lambda_1}{\lambda_2 + \lambda_1}e^{-\lambda_1(z+h)}\right]\cos(\alpha x)\cos\beta y, \quad (23)$$

where $I_1$ is the modified Bessel function of the first kind, $\lambda_2$, $\sqrt{\alpha^2+\beta^2+j\kappa^2}$, and $\kappa=\sqrt{2}/\delta$. The theoretical description of the voltage at the terminals of the receiving loop is found using Faraday's law:

$$V_e^T = j\omega\mu_0]\hat{n}\cdot\vec{H}_e]a. \quad (24)$$

Due to the use of vertical loops with surface normals perpendicular to the $\hat{x}$ direction, the $\hat{x}$ and $\hat{z}$ component of the exact field in Eq. (22) does not contribute to $\hat{n}\cdot\vec{H}_e$ or the theoretical description of the exact voltage, $V_e^T$.

Only the one-dimensional (1D) case shown in FIG. 15 is studied in the following, where distance is varied along a direction perpendicular to the surface normal axes of the loops, i.e., x coordinate is varied. The experiment was conducted above earth on an open field and has been previously described in Ref [3]. The result for the measured voltage is plotted in FIG. 15 (1510) as measured power in dB, $10 \log_{10}|V^M|^2/R$. The complex image theory description in Eq. (21) for dipole fields (m=0), and the exact integral description in Eq. (24) are also plotted in (1510), where a fixed offset was used to calibrate out the measurement gain and to make both theories agree with the measurements at a distance of 20.2 m. FIG. 15 (1515) shows the difference between the complex image and exact descriptions from the measurements.

Figure 16:
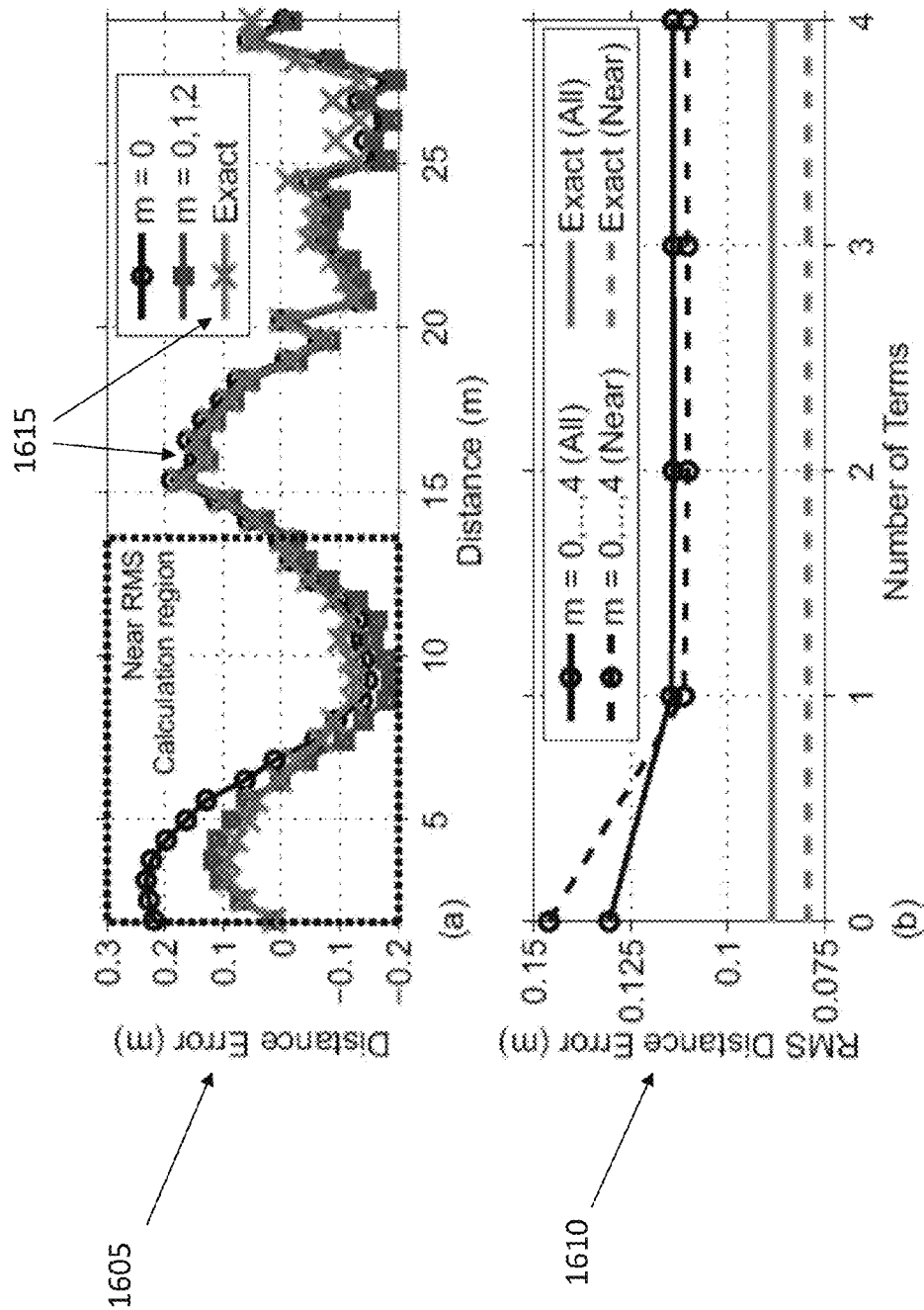
FIG. 16 illustrates the estimated distance error using complex image theory, and for the exact integral solutions.

FIG. 16 illustrates a comparison of: (1605) estimated distance error from inverting the theoretical expressions for a magnetic dipole (m=0) and a finite-sized loop (m=0,1,2) both using complex image theory, and for the exact integral solutions; (1610) RMS distance error reduction using exact integral solutions.

The closed-form field equations in Eq. (19) describing complex image theory allows a direct numerical inversion for the distance. Here, the emitter's x coordinate can be found using a non-linear least square optimization algorithm to minimize $[V_c^T-V^M]^2$, where $V^M$ is the measured voltage at the terminals of the receiving loop, see Ref. [3]. FIG. 16 (1605) shows the result of this optimization, where the distance error is estimated by finding the difference between the x coordinate solutions and the actual x coordinate. The black line (m=0) denotes the distance error due to use of complex image theory with dipole fields, whereas the blue line (m=0,1,2) includes the next two higher-order fields of the finite sized loop, see Ref. [12].

Use of the exact integral solution, which does not have a closed-form, precludes the possibility of inversion as done with complex image theory. Instead, by using the exact integral solutions in Eq. (24) of a finite-sized vertical loop, a 1D look-up table was created with the exact theoretical induced voltage values and interpolated to minimize $[V_e^T-V^M]^2$ and find an estimated x coordinate. FIG. 16 (1605) also shows the result of this interpolation and minimization, where the distance error is again estimated by finding the difference between the x coordinate solutions and the actual x coordinate. The line (1615) denotes the distance error due to use of the exact integral solutions. FIG. 16 (1610) provides an analysis of the RMS distance error using complex image theory and the exact integral solutions. The exact integral solution gives an RMS error of 0.089 m and 0.079 m, for distances between 1.3-29.4 m and 1.3-13.5 m, respectively. This is compared to the result of 0.114 m and 0.110 m, for the same distances from use of complex image theory and spherical harmonics to model a finite-sized loop with m=0, . . . , 4.

As discussed above, the magnetoquasistatic field equations can be decoupled into position and orientation in the two-dimensional (2D) space of the fixed sensor or mobile device plane, even over long-ranges (see Ref. [11]). This approach is possible due to a few mathematical approximations made possible by the physical nature of magnetoquasistatic coupling near a conducting ground (as described above and in Ref. [11]). The device to be tracked can be the transmitter or the receiver, with the fixed sensor being the receiver or the transmitter. In addition to the 2D position and orientation of the device, the theory can be further extended to enable 2D azimuth direction sensing of the device (as discussed above and in Ref [14]). A remaining problem of importance is the case of z-location tracking in the cartesian 3D coordinate frame. Under this translation, it is important to know if the magnetoquasistatic field equations can be decoupled meaningfully for 3D position sensing.

In the following section, the 3D problem in magnetoquasistatics is discussed and it is shown that the field equations can be decoupled to enable linear 3D position sensing of the device by extending the framework presented above. The closed-form solutions derived here permit full 3D position sensing of the mobile device using a single fixed device, and do not require trilateration or triangulation.

Figure 17:
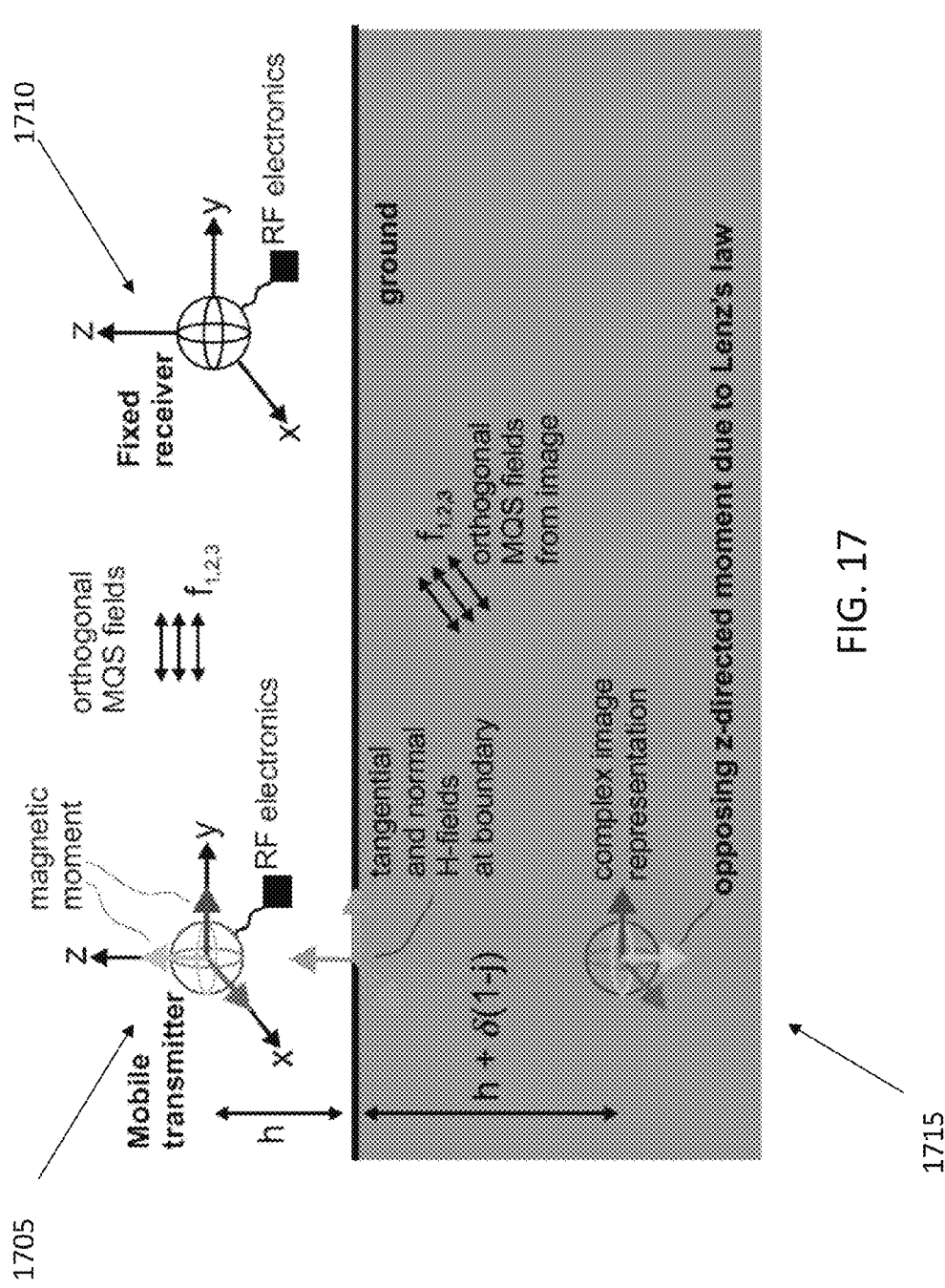
FIG. 17 illustrates the 3D problem with 3-axis transmitting coils and their respective magnetic moments.

FIG. 17 illustrates the 3D problem with 3-axis transmitting (1705) and receiving (1710) coils and their respective magnetic moments. The complex image is also shown below the ground (1715).

Figure 18:
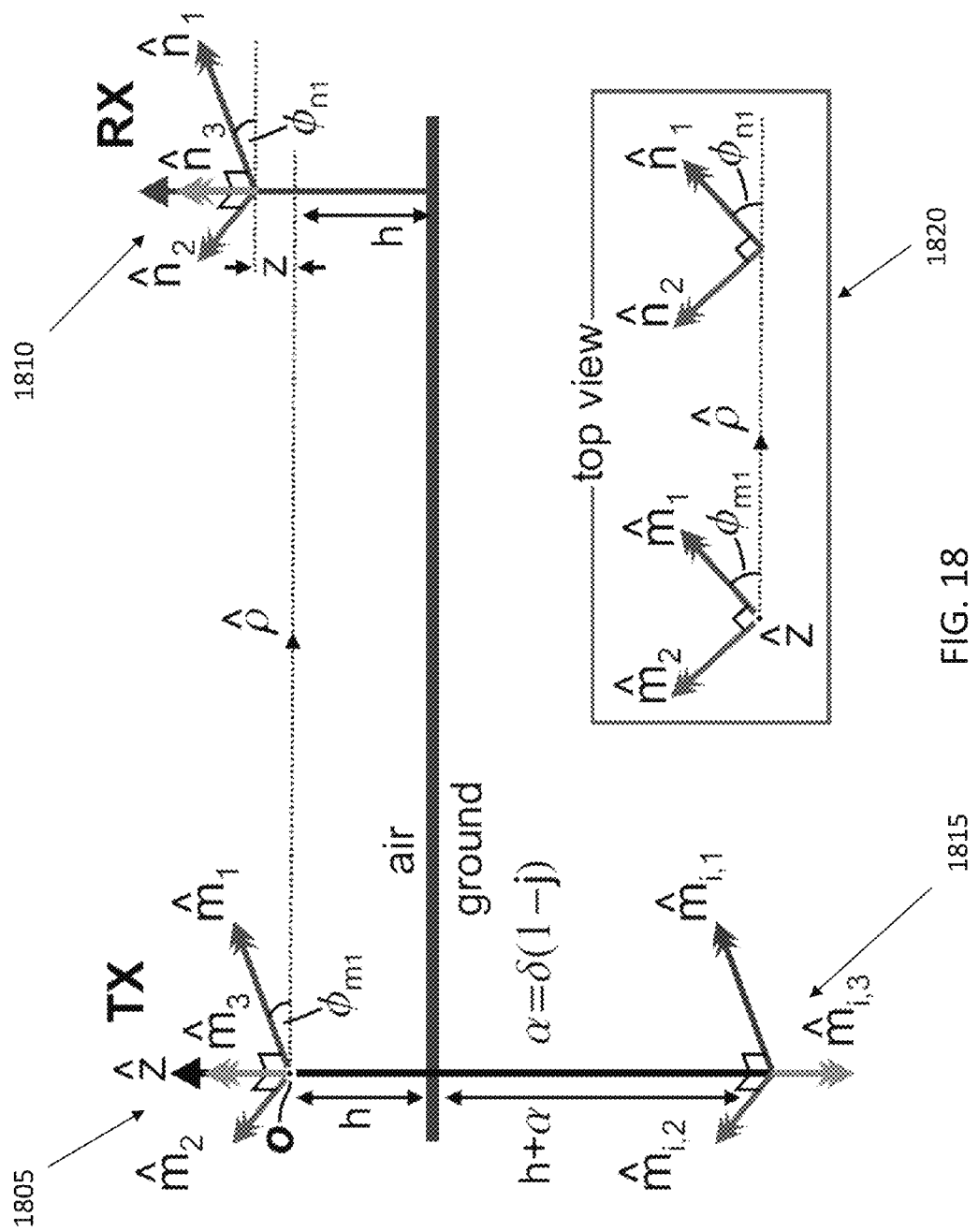
FIG. 18 illustrates a mathematical description of the 3D position sensing problem.

FIG. 18 illustrates a mathematical description of the 3D position sensing problem. The receiver (1810) is assumed as the device to be tracked, without loss of generality. The device to be tracked is permitted a change in z-location. A transmitter (1805) is also illustrated, with a ground image (1815) and a top view (1820). In contrast with FIG. 1, the magnetic moments are illustrated with three components instead of two.

In the previous embodiments, two-axis coils were used. However, in other embodiments, three-axis coils can be used, permitting 3D instead of 2D positioning.

For 3D position sensing in MQS over long-ranges, ground effects due to induced eddy-currents in the ground cannot be neglected. Following the framework described above and in Ref. [11], it is required that the transmitting and receiving device have 3-axis coils. The system is described in FIG. 17, where each transmitter coil and its corresponding complex image is described using magnetic moments to simplify the mathematical discussion. This approximation is sufficiently accurate for any appreciable range (greater than a few diameters from the coils).

To understand the effect of 3-axis magnetic moments, it is necessary to study the coupling at the receiver due to an arbitrarily oriented transmitter magnetic moment. Due to the boundary condition made by the air-ground interface, it is helpful to decompose the arbitrary transmitter moment into its vertical and horizontal components, $\hat{m}=m_\rho\hat{\rho}(\phi)+m_z\hat{z}$, where the magnitude of the moment in the horizontal plane is given by $m_\rho$, while the magnitude of the moment in the vertical plane is given by $m_z$. Following this convention, it is also helpful to decompose the receiver's moment into its vertical and horizontal components, $\hat{n}=n_\rho\hat{\rho}(\phi)+n_z\hat{z}$. The voltage measured at the terminals of the receiver coil with the surface normal, $\hat{n}$, is given by Eq. (25), where $c=-j\omega\mu_o\alpha/4\pi$.

$$V = c\left\{\left[\begin{array}{c}3\left[(m_\rho\hat{\rho}+m_z\hat{z})\cdot\left(\left(\frac{\rho}{r}\right)\hat{\rho}+\left(\frac{z}{r}\right)\hat{z}\right)\times(n_\rho\hat{\rho}+n_z\hat{z})\cdot\left(\left(\frac{\rho}{r}\right)\hat{\rho}+\right.\right.\\ \left.\left(\frac{z}{r}\right)\hat{z}\right)\right]-(m_\rho\hat{\rho}+m_z\hat{z})\cdot(n_\rho\hat{\rho}+n_z\hat{z})\end{array}\right\}\frac{1}{r^3}+\right.$$

$$\left.\left\{\begin{array}{c}3\left[(m_\rho\hat{\rho}-m_z\hat{z})\cdot\left(\left(\frac{\rho}{r_i}\right)\hat{\rho}+\left(\frac{z_i}{r_i}\right)\hat{z}\right)\times(n_\rho\hat{\rho}+n_z\hat{z})\cdot\right.\\ \left.\left(\left(\frac{\rho}{r_i}\right)\hat{\rho}+\left(\frac{z_i}{r_i}\right)\hat{z}\right)\right]-(m_\rho\hat{\rho}-m_z\hat{z})\cdot(n_\rho\hat{\rho}+n_z\hat{z})\end{array}\right\}\frac{1}{r_i^3}\right] \quad (25)$$

The terms in Eq. (25) for the horizontal and vertical moments do not act on perpendicular $\hat{r}$ unit vectors, therefore Eq. (25) can be significantly simplified. Additionally, since the vertical magnetic moments of $m_z\hat{z}$ interact in a destructive manner with its complex image, $-m_z\hat{m}$, it is useful to gather these terms separately from all other terms. Finally, to simplify the analysis, two separable cases are studied below: the total voltage at the horizontal moment sensor, $n_\rho\hat{\rho}$, and at the vertical moment sensor, $n_z\hat{}$. With these voltages, the total voltage sensed at the horizontal $\hat{n}$ is given by:

$$V(\hat{n}_\rho) = \qquad (26)$$
$$-j\frac{\omega\mu_o\alpha}{4\pi}\left[3(\vec{m}_\rho\cdot\hat{\rho})(\vec{n}_\rho\cdot\hat{\rho})\left[\frac{(\rho/r)^2}{r^3}+\frac{(\rho/r_i)^2}{r_i^3}\right]-(\vec{m}_\rho\cdot\vec{n}_\rho)\left[\frac{1}{r^3}+\frac{1}{r_i^3}\right]+\right.$$
$$\left.3(\vec{m}_z\cdot\hat{z})(\vec{n}_\rho\cdot\hat{\rho})\left[\frac{(z\rho/r^2)}{r^3}-\frac{(z_i\rho/r_i^2)}{r_i^3}\right]\right]$$

The third term in Eq. (26) is negligible for medium to long ranges or distances, such that $(r/r_i)^3 \to 1$, if the height is approximately less than the radial distances, such that $z<\rho$. For longer ranges or distances, the third term can also be neglected for $\rho<z$. The main reason for this is that since a 3-axis transmitter moment will be used, the first term, due to the horizontal moment, will have a much stronger contribution than the third term due to the cancelation in the third term. This is always true since the two horizontal moments in the transmitter are orthogonal to each other and will always give a strong contribution to the first term. Under these criteria, the total voltage sensed at the horizontal $\hat{n}$ can be simplified to give:

$$V(\hat{n}_\rho) \approx \qquad (27)$$
$$-j\frac{\omega\mu_o\alpha}{4\pi}\left[3(\vec{m}_\rho\cdot\hat{\rho})(\vec{n}_\rho\cdot\hat{\rho})\left[\frac{(\rho/r)^2}{r^3}+\frac{(\rho/r_i)^2}{r_i^3}\right]-(\vec{m}_\rho\cdot\vec{n}_\rho)\left[\frac{1}{r^3}+\frac{1}{r_i^3}\right]\right].$$

The goal as discussed in Ref. [11] is to approximately decouple the range terms from the orientation, elevation, and azimuth terms in Eq. (27). To this order, Eq. (27) can be rewritten by a simple factorization as:

$$V(\hat{n}_\rho) \approx c[3(\vec{m}_\rho\cdot\hat{\rho})(\vec{n}_\rho\cdot\hat{\rho})C_\phi-(\vec{m}_\rho\cdot\vec{n}_\rho)]\left[\frac{1}{r^3}+\frac{1}{r_i^3}\right], \qquad (28)$$

where $c=j\omega\mu_o\alpha 4/\pi$, and the factor $C_\phi$ is given by:

$$C_\phi = \frac{(\rho/r)^2/r^3+(\rho/r_i)^2/r_i^3}{1/r^3+1/r_i^3} \qquad (29)$$

-continued
$$\approx \frac{(\rho/r)^2/r^3+0}{1/r^3+0} = \left(\frac{\rho}{r}\right)^2, \quad r \to 0$$
$$\approx \frac{2\times(\rho/r)^2/r^3}{2\times 1/r^3} = \left(\frac{\rho}{r}\right)^2, \quad r \to \infty,$$

where it follows that $C_\phi \approx (\rho/r)^2$ is a good approximation for short to long ranges. In the following, the remaining vertical equations are discussed.

The total voltage sensed at the vertical $\hat{n}$ is given by:

$$V(\hat{n}_z) = -j\frac{\omega\mu_o\alpha}{4\pi}\left[3(\vec{m}_\rho\cdot\hat{\rho})(\vec{n}_z\cdot\hat{z})\left[\frac{(\rho z/r^2)}{r^3}+\frac{(\rho z_i/r_i^2)}{r_i^3}\right]- \right. \qquad (30)$$
$$\left.(\vec{m}_z\cdot\vec{n}_z)\left[\frac{1}{r^3}-\frac{1}{r_i^3}\right]+3(\vec{m}_z\cdot\hat{z})(\vec{n}_z\cdot\hat{z})\left[\frac{(z/r)^2}{r^3}-\frac{(z_i/r_i)^2}{r_i^3}\right]\right]$$

Following similar considerations (and as can be seen in Ref [14]), it can be noticed that under any appreciably long-ranges, the third term becomes negligible. The second term can also be neglected for appreciable ranges since it will be much weaker than the second term in Eq. (27). With these approximations, the total voltage sensed at the vertical $\hat{n}$ can be simplified to give:

$$V(\hat{n}_z) \approx -j\frac{\omega\mu_o\alpha}{4\pi}[3(\vec{m}_\rho\cdot\hat{\rho})(\vec{n}_z\cdot\hat{z})]\left[\frac{(\rho z/r^2)}{r^3}+\frac{(\rho z_i/r_i^2)}{r_i^3}\right] \qquad (31)$$

It can be noticed that Eq. (31) can be rewritten by simple factorization to obtain:

$$V(\hat{n}_z) = c[3(\vec{m}_\rho\cdot\hat{\rho})(\vec{n}_z\cdot\hat{z})C_\theta]\left[\frac{1}{r^3}-\frac{1}{r_i^3}\right] \qquad (32)$$

where the factor $C_\theta$ is given by:

$$C_\theta = \frac{(\rho z/r^2)/r^3+(\rho z_i/r_i^2)/r_i^3}{1/r^3+1/r_i^3} \qquad (33)$$
$$\approx \frac{(\rho z/r^2)/r^3+0}{1/r^3+0} = \frac{\rho z}{r^2}, \quad r \to 0$$
$$\approx \frac{2\times(\rho z/r)^2/r^3}{2\times 1/r^3} = \frac{\rho z}{r^2}, \quad r \to \infty,$$

where it follows that $C_\theta = \rho z/r^2$ is a good approximation for short to long ranges. The above concludes the derivations for the MQS field theory. The solutions derived in Eqs. (28) and (32) are the foundations of the following section, where the positioning framework is presented.

The orthogonality relations of the transmitter moments are always preserved under any arbitrary rotations, due to the use of orthogonal coils on the transmitter, orthogonal magnetic moments $\hat{m}_1$, $\hat{m}_2$, and $\hat{m}_3$, and field-magnitude only sensing of in the receive coils. As discussed above, it can be assumed that $m_i$, $fil_2$, and $in_3$ are all mathematically similar, or in other words that these quantities have the same gains (or calibrated gains) as well as close center frequencies. With this condition, the preservation of orthogonality implies that under any arbitrary rotation there will be two horizontal magnetic moments, which are orthogonal to each other and parallel to the horizontal plane, and one vertical magnetic moment parallel to the vertical plane. It is then possible to obtain the solutions to the elevation-angle direction of the transmitter, and then the azimuth-angle direction of the transmitter. In a first step, the transmitter and receiver centric F equations are defined for the 3D case, which is related to the 2D case, as described above and in Refs. [11,14], where x=1,2,3, referring to each transmitter moment:

$$F_{mx} = V_{(mx \to n1)}^2 + V_{(mx \to n2)}^2 + V_{(mx \to n3)}^2 \qquad (24)$$

$$F_{nx} = V_{(nx \to m1)}^2 + V_{(nx \to m1)}^2 + V_{(nx \leftarrow mx)}^2.$$

For 3D positioning, in some embodiments it is possible to focus on the receiver-centric $F_n$. Under any rotations, as described above, there will be two orthogonal horizontal transmitter magnetic moments. These moments can be denoted as located along $\hat{m}_1$ and $\hat{m}_2$, which are orthogonal to each other, but can assume any arbitrary orientation from P. Some orientations for this problem can be defined as follows (and also as in FIG. 17):

$$\hat{m}_1 \cdot \hat{\rho} = \cos\phi_{m1} \qquad (35)$$

$$\hat{n}_1 \cdot \hat{\rho} = \cos\phi_{n1}$$

$$\hat{m}_1 \cdot \hat{n}_1 = \cos(\phi_{m1} - \phi_{n1})$$

$$= \cos\phi_{m1}\cos\phi_{n1} + \sin\phi_{m1}\sin\phi_{n1}.$$

Based on this definition, we find the voltage due to transmitter $\hat{m}_1$ at receiver $\hat{n}_1$ as:

$$V_{m1-n1} = \qquad (36)$$
$$c[3C_\phi \cos\phi_{m1}\cos\phi_{n1} - \cos\phi_{m1}\cos\phi_{n1} - \sin\phi_{m1}\sin\phi_{n1}] \times \left[\frac{1}{r^3} - \frac{1}{r_i^3}\right].$$

which can be re-written in a more convenient form for further manipulations:

$$V_{m1-n1} = c[A\cos\phi_{m1}\cos\phi_{n1} - \sin\phi_{m1}\sin\phi_{n1}]\left[\frac{1}{r^3} - \frac{1}{r_i^3}\right], \qquad (37)$$

where $A = 3C_\phi - 1$. Similarly, it is possible to find $V_{m2-n1}$:

$$V_{m2-n1} = c[A\cos\phi_{m2}\cos\phi_{n1} - \sin\phi_{m2}\sin\phi_{n1}]\left[\frac{1}{r^3} - \frac{1}{r_i^3}\right]. \qquad (38)$$

Since the vertical transmitter moment does not contribute to the horizontal receiver moments as indicated by Eq. (28), $V_{m3-n1} = 0$. It is then possible to find through the same simplification approach shown above and in Refs. [11, 14], the receiver-1-centric equations, $F_{n1}$:

$$F_{n1} = \begin{Bmatrix} V_{(m1-n1)}^2 + \\ V_{(m2-n1)}^2 + \\ V_{(m3-n1)}^2 \end{Bmatrix} = c^2 B_1 \left[\frac{1}{r^3} + \frac{1}{r_i^3}\right]^2, \qquad (39)$$

where $B_1$ is given by:

$$B_1 = \frac{(A^2+1) - (A^2-1)\cos 2\phi_{n1}}{2}. \qquad (40)$$

Following the same steps, it is possible to find the receiver-2-centric equations, $F_{n2}$.

$$F_{n2} = \begin{Bmatrix} V_{(m1-n2)}^2 + \\ V_{(m2-n2)}^2 + \\ V_{(m3-n2)}^2 \end{Bmatrix} = c^2 B_2 \left[\frac{1}{r^3} + \frac{1}{r_i^3}\right]^2, \qquad (41)$$

where $B_2$ is given by:

$$B_2 = \frac{(A^2+1) - (A^2-1)\cos 2\phi_{n1}}{2}, \qquad (42)$$

where the substitution $\phi_{n2} = \phi_{n1} + \pi/2$ was made to permit writing $F_{n2}$ as a function of $\phi_{n1}$.

The final equation needed is that for $F_{n3}$, which is the vertical receiver-3-centric equation and can be found using Eq. (32). To obtain $F_{n3}$, $V_{m1-n3}$, $V_{m2-n3}$, and $V_{m3-n3}$ are calculated:

$$V_{m1-n3} = c[3C_\theta \cos\phi_{m1}]\left[\frac{1}{r^3} + \frac{1}{r_i^3}\right] \qquad (43)$$

$$V_{m2-n3} = c[3C_\theta \cos\phi_{m2}]\left[\frac{1}{r^3} + \frac{1}{r_i^3}\right]$$

$$V_{m3-n3} = 0.$$

Using the relation $\phi_{m2} = \phi_{m1} + \pi/2$, and the identity $\cos^2\phi_{m1} + \sin^2\phi_{m1} = 1$, $F_{n3}$ is then calculated:

$$F_{n3} = \begin{Bmatrix} V_{(m1-n3)}^2 + \\ V_{(m2-n3)}^2 + \\ V_{(m3-n3)}^2 \end{Bmatrix} = c^2 B_3 \left[\frac{1}{r^3} + \frac{1}{r_i^3}\right]^2, \qquad (44)$$

where $B_3$ is given by:

$$B_3 = (3C_\theta)^2. \qquad (45)$$

Having found all three receiver-centric equations, $F_{n1}$, $F_{n2}$, and $F_{n3}$, all critical equations are available to solve for the 3D positions in MQS for short to long ranges.

In a next step the method continues by solving for the elevation-direction angle of the transmitter. To accomplish this, the ratio between the vertical to horizontal $F_n$ is used. In particular, from Eqs. (39), (41), and (44), it can be found that:

$$\frac{F_{n3}}{F_{n1} + F_{n2}} = \frac{(3C_\theta)^2}{A^2+1} = \frac{(3C_\theta)^2}{(3C_\phi - 1)^2 + 1}, \qquad (46)$$

and, as previously found, $C_\theta \approx \rho z/r^2$ and $C_\phi \approx (\rho/r)^2$. Now, defining the azimuth-direction angle as $\cos\theta = \rho/r$, it can be found find that $z/r = \sin\theta$, from which it can be obtained:

$$C_\theta \approx \cos\theta \sin\theta$$

$$C_\phi \approx \cos^2\theta,$$

such that the ratio $F_{n3}/(F_{n1}+F_{n2})$ can be written as:

$$\frac{F_{n3}}{F_{n1} + F_{n2}} = \frac{(3\cos\theta\sin\theta)^2}{(3\cos^2\theta - 1)^2 + 1}. \qquad (48)$$

Figure 19:
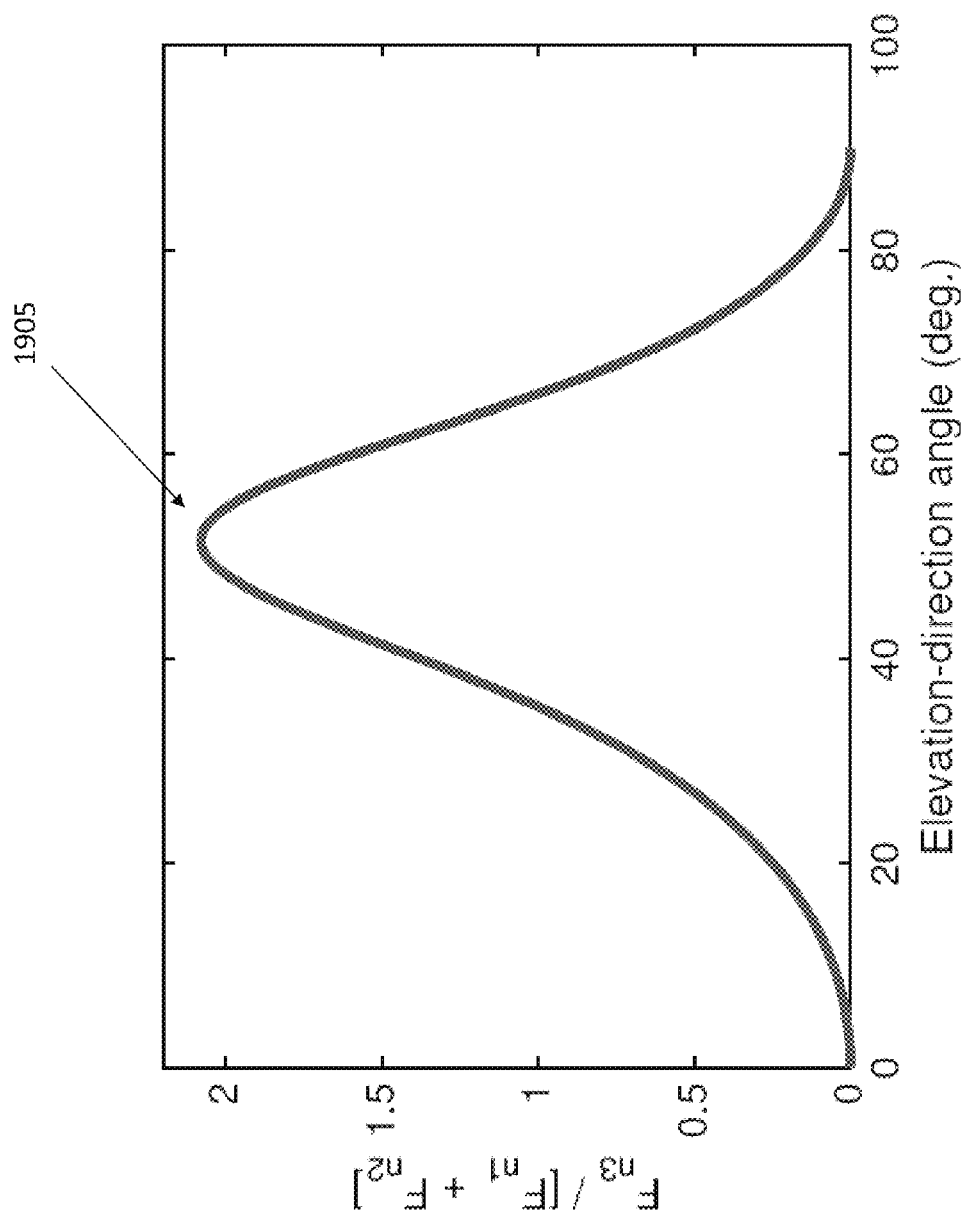
FIG. 19 shows the elevation-direction angle ratio function.

FIG. 19 illustrates a plot of $F_{n3}/(F_{n1}+F_{n2})$, the elevation-direction angle ratio function, showing an ambiguity in the solution space beyond about 52° (1905). This is not a major concern in most ground based position location systems operating over long ranges.

The next step in the method is to find the azimuth-direction angle of the transmitter. This can be found by again looking at the receiver-centric $F_n$ equations. In particular, as described above and in Ref. [11], it is known that the ratio of $F_{n1}/F_{n2}$ gives a solution for the azimuth-direction angle in 2D. For the 3D case, the ratio of Eqs. (39) to (41) can be calculated to find:

$$F_\phi = \frac{F_{n1}}{F_{n2}} = \frac{B1}{B2} = \frac{(A^2+1)-(A^2-1)\cos 2\phi_{n1}}{(A^2+1)+(A^2-1)\cos 2\phi_{n1}}, \quad (49)$$

which can be directly inverted in a similar fashion to the 2D case (as described above and in Ref. [II]) to give:

$$\phi_{n1} = \frac{1}{2}\cos^{-1}\left[\frac{(A^2+1)-(A^2+1)\times F_\phi}{(A^2-1)\times F_\phi+(A^2-1)}\right], \quad (50)$$

where it can be recalled that $A=3C_\phi-1$:

$$A = 3C_\phi - 3\cos^2\theta - 1, \quad (51)$$

and where it can also be noted that, when $\theta=0$, the azimuth-direction angle solution in Eq. (50) becomes precisely that derived in the 2D case (as described above and in Ref [11]).

The above equations give the solutions for the elevation-direction angle and the azimuth-direction angle of the transmitter. The only remaining item to obtain the full 3D location is the range. Following the approach described above, and in Ref. [11], it is possible to sum the contributions from all combinations of the transmitter moments to the receiver moments. This can be obtained by summing the contributions from all receiver-centric functions, $F_{n1}+F_{n2}+F_{n3}$:

$$F_r = \begin{Bmatrix} F_{n1}+ \\ F_{n2}+ \\ F_3 \end{Bmatrix} = c^2[B_1+B_2+B_3]\times\left[\frac{1}{r^3}+\frac{1}{r_i^3}\right]^2 \quad (52)$$

$$= c^2[A^2+1+(3C_\theta)^2]\times\left[\frac{1}{r^3}+\frac{1}{r_i^3}\right]^2,$$

where the term in the brackets can be rewritten as:

$$A^2+1+(3C_\theta)^2 = (3C_\phi-1)^2+1+(3C_\theta)^2 \quad (53)$$

$$= (3\cos^2\theta-1)^2+(3\cos\theta\sin\theta)^2+1$$

$$= 5-3\sin^2\theta,$$

which results in the simplified $F_r$:

$$F_r = c^2[5-3\sin^2\theta]\times\left[\frac{1}{r^3}+\frac{1}{r_i^3}\right]^2. \quad (54)$$

For $\theta=0$, $F_r$ reduces to exactly the solutions derived in the 2D case, as described above and in Ref [11]. This completes the solutions for the 3D position of the transmitter.

The algorithm to determine the 3D positions is as follows: By numerically solving Eq. (48), a solution is obtained for the elevation-direction angle, $\theta$. Once $\theta$ is known, A is also known, from which the inverted form in Eq. (50) can be used to solve directly for the azimuth-direction angle, and Eq. (54) can be used to solve for the range to the transmitter through the same numerical inversion technique described above and in Ref [11] for the 2D range.

In the above section, a new decoupled theory in magnetoquasistatics was described, showing that the 3D positions of a mobile magnetoquasistatic device can be found using linear closed-form equations. The linear closed form solutions can be used to find the 3D location of a mobile device over short to long ranges above a half-space such as earth.

In the following the 3D orientation sensing problem of the mobile device is discussed. In the section above the decoupled magnetoquasistatic coupling between an arbitrarily oriented mobile magnetic dipole (or an excited electrically-small coil) and an arbitrary receiving coil was derived. Due to the use of a 3-axis receiver architecture, the problem was simplified by assuming that the receiving coils were either horizontal (vertical moment) or vertical (horizontal moment). The purpose was to decompose the problem in relation to the boundary condition to enable a simplification in the analysis.

The coupling from the transmitter moment to the horizontal receiver moment is given by (as seen above and in Ref. [15]):

$$V(\hat{n}_\rho) \approx c[3(\vec{m}_\rho\cdot\hat{\rho})(\vec{n}_\rho\cdot\hat{\rho})C_\phi - (\vec{m}_\rho\cdot\vec{n}_\rho)]\left[\frac{1}{r^3}+\frac{1}{r_i^3}\right], \quad (55)$$

where $c=j\omega\mu_0\alpha/4\pi$, and the factor $C_\phi\approx(\rho/r)^2$. The coupling from the transmitter moment to the vertical receiver moment is given by:

$$V(\hat{n}_z) \approx c[3(\vec{m}_\rho\cdot\hat{\rho})(\vec{n}_z\cdot\hat{z})C_\theta - (\vec{m}_\rho\cdot\vec{n}_\rho)]\left[\frac{1}{r^3}+\frac{1}{r_i^3}\right] \quad (56)$$

where the factor $C_\theta\approx\rho z/r^2$. Eqs. (55) and (56) are general to arbitrary orientations of the transmitting magnetic moment. To enable closed-form solutions for 3D position sensing, it was shown that both the transmit and receive system required 3-axis coils. To simplify the analysis, it was chosen to constrain the 3-axis transmitter system such that its moments were aligned along the x, y, and z axis, respectively. This resulted in $\hat{m}_1\cdot\hat{\rho}=\cos\phi_{m1}$, and $\hat{m}_1\cdot\hat{n}_1=\cos(\phi_{m1}-\phi_{n1})$, for the magnetic moment of the transmitter moment, $m_1$. To remove this restriction, the dot product is redefined as follows:

$$\hat{m}_1\cdot\hat{\rho} = \cos\theta_{m1}\cos\phi_{m1} \quad (57)$$

$$\hat{n}_1\cdot\hat{\rho} = \cos\phi_{n1}$$

$$\hat{m}_1\cdot\hat{n}_1 = \cos\theta_{m1}\cos(\phi_{m1}-\phi_{n1})$$

$$= \cos\theta_{m1}[\cos\phi_{m1}\cos\phi_{n1}+\sin\phi_{m1}\sin\phi_{n1}],$$

where the factor $\cos\theta_{mi}$ describes the elevation of the transmitting magnetic dipole from the horizontal plane.

Due to Eq. (57), the explicit coupling equations need to be updated. To obtain range-invariant orientation sensing, the transmitter-centric coupling equations need to be studied, see Ref. [11]. The coupling of $m_1$ to the each of the 3-axis coils is studied, now with the assumption that $m_1$ can obtain an arbitrary 3D orientation based on Eq. (57). The voltage measured due to $m_1$ at receiver $n_1$ is given by:

$$V_{m1-n1} = c[3C_\phi \cos\theta_{m1}\cos\phi_{m1}\cos\phi_{n1} - \cos\theta_{m1}\cos(\phi_{m1} - \phi_{n1})] \times \left[\frac{1}{r^3} + \frac{1}{r_i^3}\right]. \quad (58)$$

Following similar manipulations, the voltage at receivers $n_2$ and $n_3$ can be found:

$$V_{m1-n2} = c[3C_\phi \cos\theta_{m1}\cos\phi_{m1}\cos\phi_{n2} - \cos\theta_{m1}\cos(\phi_{m1} - \phi_{n2})] \times \left[\frac{1}{r^3} + \frac{1}{r_i^3}\right], \quad (59)$$

$$V_{m1-n3} = c[3C_\theta \cos\theta_{m1}\cos\phi_{m1}] \times \left[\frac{1}{r^3} + \frac{1}{r_i^3}\right]. \quad (60)$$

The solutions above describe the coupling to each receiver moment due to an arbitrarily located and orientated transmitting magnetic moment. Therefore, the solutions for the remaining magnetic moment, $m_2$, can be found by using $\theta_{m2}$ instead of $\phi_{m1}$ and $\phi_{m2}$ instead of $\phi_{m1}$, and similarly, the solutions for $m_3$, can be found by using $\theta_{m3}$ instead of $\theta_{m1}$ and $\phi_{m3}$ instead of $\phi_{m1}$.

The new solutions in Eqs. (58)-(60) are different compared with those in Ref. [15]. It is expected that the position and ranging functions are still invariant under arbitrary rotations of the 3-axis transmitter system, due to the orthonormal basis used. It is valuable to show that this is indeed the case with Eqs. (58)-(60). The total power due to $m_1$ is first found, where upon some mathematical manipulations and simplifications, it is obtained:

$$F_{m1} = \left\{\begin{array}{l} V_{(m1-n1)}^2 + \\ V_{(m1-n2)}^2 + \\ V_{(m1-n3)}^2 \end{array}\right\} = c^2 B_{m1} \left[\frac{1}{r^3} + \frac{1}{r_i^3}\right]^2, \quad (61)$$

where $B_{m1}$ is given by:

$$B_{m1} = \cos^2\theta_{m1}\cos\phi_{m1} + (9C_\theta^2 - 6C_{100} + 9C_{100}^2)\cos^2\phi_{m1}. \quad (62)$$

Following the same approach to find $F_{m2}$ for $m_2$, and $F_{m3}$ for $m_3$, the sum $F_r = F_{m1} + F_{m2} + F_{m3}$ can be found:

$$F_r = \left\{\begin{array}{l} F_{(m1)} + \\ F_{(m2)} + \\ F_{(m3)} \end{array}\right\} = c^2 B_m \left[\frac{1}{r^3} + \frac{1}{r_i^3}\right]^2, \quad (63)$$

where $B_m$ is now given by:

$$B_m = \cos^2\theta_{m1}\cos^2\phi_{m1} + \cos^2\theta_{m2}\cos^2\phi_{m2} + \cos^2\theta_{m3}\cos^2\phi_{m3} + \quad (64)$$
$$(9C_\theta^2 - 6C_\phi + 9C_\phi^2) \times [\cos^2\phi_{m1} + \cos^2\phi_{m2} + \cos^2\phi_{m3}] =$$
$$1 + 9C_\theta^2 - 6C_\phi + 9C_\phi^2,$$

where $C_\phi \approx \cos\theta$ and $C_\theta \approx \cos\theta\sin\theta$. The range solutions that are derived from $F_r$ in Eq. (63) (see Ref. [15]) are only a function of the elevation-direction angle of the transmitter, $\theta$, and not a function of the transmitters orientations, $\theta_{m1,2,3}$ or $\phi_{m1,2,3}$. A similar analysis can be done to show that $F_{n1,2,3}$ in Ref. [15], and hence the azimuth-direction and elevation-direction angles remains invariant of the transmitters orientations, $\theta_{m1,2,3}$ or $\phi_{m1,2,3}$.

To emphasize the azimuth orientation of the transmitter and based on the form of Eqs. (55) and (56), it is possible to analyze the ratio of $V_{m1-n1}^2/V_{m1-n3}^2$ to find:

$$\frac{V_{m1-n1}^2}{V_{m1-n3}^2} = \frac{(\cos\phi_{n1} - 3C_\phi\cos\phi_{n1} + \sin\phi_{n1}\tan\phi_{m1})^2}{9C_\theta^2}, \quad (65)$$

Which is dependent on $\phi_{m1}$, along with $\phi_{n1}$, and $\theta$. To remove the dependence on $\phi_{n1}$, it is possible to use the summation of the power of ratios between the horizontal and vertical coupling equations, $V_{m1-n1}^2/V_{m1-n3}^2 + V_{m1-n2}^2/V_{m1-n3}^2$:

$$F_{\phi m1} = \frac{V_{m1-n1}^2}{V_{m1-n3}^2} + \frac{V_{m1-n2}^2}{V_{m1-n3}^2} = \frac{9C_\phi^2 - 6C_\phi + \sec^2\phi_{m1}}{9C_\theta^2}, \quad (66)$$

which is no longer dependent on $\phi_{n1}$. Eq. (66) can be directly inverted to find the azimuth orientation of the transmitter moment $m_1$:

$$\phi_{m1} = \cos^{-1}\left[\left(\frac{1}{9C_\theta^2 F_{\phi m1} - 9C_\phi^2 + 6C_\phi}\right)^{1/2}\right]. \quad (67)$$

To emphasize the elevation orientation of the transmitter and based on the form of Eqs. (55) and (56), it is possible to investigate the ratio of $V_{m1-n3}^2/F_r$ to find:

$$F_{\theta m1} = \frac{V_{m1-n3}^2}{F_r} = \frac{9C_\theta^2\cos^2\phi_{m1}\sin^2\theta_{m1}}{9C_\theta^2 + (1 - 3C_\phi)^2}, \quad (68)$$

where we find dependence on $\cos\phi_{m1}$ and $\sin\theta_{m1}$. Since it is possible to solve for $\cos\phi_{m1}$ using Eq. (67), it is possible in-turn to invert for the elevation angle of the transmitter moment $m_1$, $\theta_{m1}$, by inverting Eq. (68):

$$\theta_{m1} = \sin^{-1}\left[\left(\frac{9C_\theta^2 + (1 - 3C_\phi)^2}{9C_\theta^2\cos^2\phi_{m1}}F_{\theta m1}\right)^{1/2}\right]. \quad (69)$$

The derivations given in Eqs. (67) and (69) are straight-forward and elegant, but present a problem. Firstly, Eq. (67) is not sensitive to $F_{\phi m1}$ when $C_o > 0$, which is the case on the 2D x-y plane that is of importance in long-range ground based positioning. Secondly, Eq. (69) is not sensitive to $F_{\theta m1}$ when $C_\theta \to 0$ or $\cos\phi_{m1} > 0$, which is also on the 2D x-y plane or for $\phi_{m1} \to \pi/2$. The reason for this difficulty is that the $1/_{7,21-3}$ is used, which becomes a null field on the 2D x-y plane for long-distances due to multiplication with $C_\theta \approx \rho z/r^2$, caused by the boundary conditions. In addition, it is not possible to use the ratio conventions used in Ref [11] because the magnetic moment is no longer on a fixed 2D plane. To avoid these problems, it is possible to take the ratio between the field seen at receiver coil 1 to receiver coil 2, since both have horizontal moments to find:

$$F_{\phi m1} = \frac{V_{m1-n1}^2}{V_{m1-n2}^2} \tag{70}$$

$$= \frac{(\cos(\phi_{m1} - \phi_{n1}) - 3C_\phi \cos(\phi_{m1})\cos(\phi_{n1}))^2}{(3C_\phi \cos(\phi_{m1})\sin(\phi_{n1}) + \sin(\phi_{m1} - \phi_{n1}))^2},$$

which is now a function of $\phi_{m1}$, $\phi_{n1}$, and $C_\phi$. In Eq. (70), $C_\theta$ is not present and does not reduce the sensitivity of $F_{emi}$ in the inverted solutions. The un-approximated solution for $\phi_{m1}$ is then given by:

$$\phi_{m1} = -\cos^{-1}\left(-\sqrt{\frac{D1 + D2 + D3}{D4 + D5}}\right), \tag{71}$$

$$D1 = 4(F_{\phi m1}^2 - 1)\cos(2\phi_{n1})$$

$$D2 = 32\sqrt{F_{\phi m1}(F_{\phi m1} + 1)^2 \sin^2(2\phi_{n1})}$$

$$D3 = -3(F_{\phi m1} + 1)^2 \cos(4\phi_{n1}) + F_{\phi m1}(7F_{\phi m1} + 38) + 7$$

$$D4 = -60(F_{\phi m1}^2 - 1)\cos(2\phi_{n1})$$

$$D5 = 9(F_{\phi m1} + 1)^2 \cos(4\phi_{n1}) + F_{\phi m1}(59F_{\phi m1} + 46) + 59.$$

The closed form solution given in Eq. (71) is always valid and sensitive to $F_{\phi m1}$ under any $C_\theta$, $C_\phi$, and for all $\phi_{n1}$. Once $\phi_{m1}$ is known, it is possible to find the elevation angle of the transmitter moment by instead studying the ratio of $V_{m1-n1}^2 + V_{m1-n2}^2 + V_{m1-n3}^2$ to the total power found through $F_r$ in Ref. [15]:

$$F_{\theta m1} = \frac{V_{m1-n1}^2 + V_{m1-n2}^2 + V_{m1-n3}^2}{F_r} \tag{72}$$

$$= \frac{\cos^2(\theta_{m1})(3(3C_\theta^2 + C_\phi(3C_\phi - 2))\cos^2(\phi_{m1}) + 1)}{9C_\theta^2 + (1 - 3C_\phi)^2},$$

which can be directly inverted to find the elevation angle, $\theta_{m1}$:

$$\theta_{m1} = \cos^{-1}\left(-\frac{\sqrt{F_{\theta m1}}\sqrt{9C_\theta^2 + 9C_\phi^2 - 6C_\phi + 1}}{\sqrt{D6 + D7}}\right), \tag{73}$$

$$D6 = 9C_\theta^2 \cos^2(\phi_{m1})$$

$$D7 = 9C_\phi^2 \cos^2(\phi_{m1}) - 6C_\phi \cos^2(\phi_{m1}) + 1.$$

The algorithm is straightforward. By solving Eqs. (71) and then Eq. (73), it is possible to find the azimuth orientation and elevation orientation the transmitter moment $m_1$. It is possible to repeat similar calculations to obtain $F_{\phi m2}$ and $F_{\theta m2}$ for transmitter moment $m_2$, from which it is possible to solve for $\phi_{m2}$ and $\theta_{m2}$, and then $F_{\phi m3}$ and $F_{\theta m3}$ for transmitter moment $m_3$. In turn, it is then possible to solve for $\phi_{m3}$ and $\theta_{m3}$. With these solutions, the full arbitrary 3D orientation of the mobile transmitter system is known.

The current closed-form solutions for 3D orientation sensing, used with the closed-form solutions for 3D position sensing derived in Ref. [15], completes the problem of 3D position and orientation sensing using magnetoquasistatic fields for short to long ranges using complex image theory. The forms derived allow use of complex image theory or higher order corrections to complex image theory, as noted in Ref [11], and permit closed-form solutions for 3D position and orientation sensing of a mobile device using a single fixed sensor with 3-axis orthogonal coils.

In some embodiments of the present disclosure, an advantage of the methods described herein is the ability to use a single sensor instead of multiple sensors, to carry out the positioning through quasistatic magnetic fields. Another advantage is the decoupling of the equations for the orientation and the position, therefore having decoupled errors in orientation and position. In some embodiments, the methods of the present disclosure can be carried out by having a receiver or a transmitter with a known location. This can mean that the receiver or transmitter have a fixed location, or they may be moving in a known way, therefore still having a known location. In embodiments with two or three axis, implemented, for example, with two or three orthogonal coils, each coil can sense a signal from the two or three coils in the transmitter. In other words, a first receiver coil can independently sense two or three independent signals from each of the two or three transmitting coils. Several methods can be employed to maintain the independence between the two or three signals. For example, a different frequency may be used for each of the three orthogonal coils, or multiplexing may be used. Multiplexing can comprise sending signals for each direction at a different time, according to a specified sequence. Other methods to differentiate between the three signals can also be implemented, as understood by the person of ordinary skill in the art. In some embodiments, the methods described in the present disclosure decouple the horizontal and vertical components of the ground fields.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," an and the include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] D. D. Arumugam, J. D. Griffin, D. D. Stancil, and D. S. Ricketts. Error reduction in magnetoquasistatic positioning using orthogonal emitter measurements. *Antennas and Wireless Propagation Letters, IEEE*, 11:1462-1465, 2012.

[2] D. D. Arumugam, J. D. Griffin, D. D. Stancil, and D. S. Ricketts. Three-dimensional position and orientation measurements using magneto-quasistatic fields and complex image theory [measurements corner]. *Antennas and Propagation Magazine, IEEE*, 56(1):160-173, February 2014.

[3] D. D. Arumugam, J. D. Griffin, and D. D. Stancil. Experimental demonstration of complex image theory and application to position measurement. *Antennas and Wireless Propagation Letters, IEEE*, 10:282-285, 2011.

[4] B. Denis, J. K. Keignart, and N. Daniele. Impact of nlos propagation upon ranging precision in uwb systems. In *Ultra Wideband Systems and Technologies, 2003 IEEE Conference on*, pages 379-383,2003.

[5] D.-G. Fang, J. J. Yang, and G.-Y. Delisle. Discrete image theory for horizontal electric dipoles in a multilayered medium. *Microwaves, Antennas and Propagation, IEE Proceedings H*, 135(5):297-303, Oct 1988.

[6] Ziyi Jiang and Paul D. Groves. Nlos gps signal detection using a dual-polarisation antenna. *GPS Solutions, pages 1-12,2012.*

[7] A. D. Koutsou, F. Seco, A. R. Jimenez, J. O. Roa, J. L. Ealo, C. Prieto, and J. Guevara. Preliminary localization results with an rfid based indoor guiding system. In *Intelligent Signal Processing, 2007. WISP 2007. IEEE International Symposium on*, pages 1-6,2007.

[8] F. R. Raab. Quasi-static magnetic-field technique for determining position and orientation. *IEEE Trans. on Geoscience and Remote Sensing*, GE-19(4):235-243, October 1981.

[9] F. Raab, E. Blood, Steiner T., and Jones H. Magnetic Position and Orientation Tracking System. *IEEE Trans. on Aerospace and Electrical Systems*, AES-15(5):709-718,1979.

[10] Jürg Schweizer and Georges Kriisi. Testing the performance of avalanche transceivers. *Cold Regions Science and Technology*, 37(3):429-438, 2003. ISSW 2002: International Snow Science Workshop.

[11] D. D. Arumugam. Decoupled range and orientation sensing in long-range magnetoquasistatic positioning. *Antennas and Wireless Propagation Letters, IEEE*, 14:654-657, 2015.

[12] D. Arumugam, J. Griffin, D. Stancil, and D. Ricketts. Higher order loop corrections for short range magnetoquasistatic position tracking. In *Antennas and Propagation (APSURSI), 2011 IEEE International Symposium on*, pages 1755-1757, 2011.

[13] E. E. Kriezis and I. E. Xypteras. Eddy current distribution and loss in a semi-infinite conducting space due to a vertical current loop. *ETZ Archiv*, pages 201-7, July 1979.

[14] D. D. Arumugam. Two-dimensional long-range magnetoquasistatic positioning through azimuth-direction decoupling. *JPL, New Technology Report*, 2014.

[15] D. D. Arumugam. Closed-form solutions in 3d mqs positioning. *JPL, New Technology Report*, 2015.

What is claimed is:

1. A method comprising:
providing a receiver, the receiver comprising a first and second receiver coils configured to receive quasistatic magnetic fields in a first and second mutually orthogonal directions transmitted by a transmitter, the transmitter comprising a first and second transmitter coils and configured to transmit the quasistatic magnetic fields in a third and fourth mutually orthogonal directions;
receiving the quasistatic magnetic fields through the receiver;
measuring, with the receiver, a first voltage originating from the quasistatic magnetic fields due to coupling between the first transmitter coil and the first receiver coil;
measuring, with the receiver, a second voltage originating from the quasistatic magnetic fields due to coupling between the second transmitter coil and the first receiver coil;
measuring, with the receiver, a third voltage originating from the quasistatic magnetic fields due to coupling between the first transmitter coil and the second receiver coil;
measuring, with the receiver, a fourth voltage originating from the quasistatic magnetic fields due to coupling between the second transmitter coil and the second receiver coil; and
based on the first, second, third, and fourth voltages, calculating a distance between the receiver and the transmitter, wherein the measuring of each of the first, second, third, and fourth voltages is independent from the remaining voltages.

2. The method of claim 1, further comprising, based on the first, second, third, and fourth voltages, calculating an orientation of the receiver or of the transmitter.

3. The method of claim 1, further comprising, based on the first, second, third, and fourth voltages, calculating an azimuthal angle of the receiver or of the transmitter.

4. The method of claim 2, wherein calculating a distance between the receiver and the transmitter and calculating an orientation of the receiver or of the transmitter are based on mutually decoupling the distance and the orientation.

5. The method of claim 4, wherein providing a receiver comprises only one receiver system.

6. The method of claim 4, wherein calculating a distance between the receiver and the transmitter and calculating an orientation of the receiver or of the transmitter comprise receiving a location of either the receiver or the transmitter.

7. The method of claim 6, wherein independently measuring each of the first, second, third, and fourth voltages is by receiving the quasistatic magnetic fields at a different frequency for the mutually orthogonal directions.

8. The method of claim 6, wherein independently measuring each of the first, second, third, and fourth voltages is by receiving the quasistatic magnetic fields at a different time for the mutually orthogonal directions.

9. The method of claim 2, wherein calculating a distance between the receiver and the transmitter and calculating an orientation of the receiver or of the transmitter are based on decomposing a near-ground magnetoquasistatic dipole into horizontal and vertical components.

10. The method of claim 9, wherein decomposing a near-ground magnetoquasistatic dipole into horizontal and vertical components comprises approximating the near-ground magnetoquasistatic dipole by complex image theory.

11. The method of claim 10, wherein calculating a distance between the receiver and the transmitter and calculating an orientation of the receiver or of the transmitter are further based on decomposing the received quasistatic magnetic fields into horizontal and vertical components, and using the horizontal component only, for the received quasistatic magnetic fields.

12. A method comprising:
providing a receiver, the receiver comprising a first and second receiver coils configured to receive quasistatic magnetic fields in a first and second mutually orthogonal directions;
providing a transmitter, the transmitter comprising a first and second transmitter coils and configured to transmit the quasistatic magnetic fields in a third and fourth mutually orthogonal directions;
transmitting the quasistatic magnetic fields through the transmitter;
receiving the quasistatic magnetic fields through the receiver;
measuring, with the receiver, a first voltage originating from the quasistatic magnetic fields due to coupling between the first transmitter coil and the first receiver coil;
measuring, with the receiver, a second voltage originating from the quasistatic magnetic fields due to coupling between the first transmitter coil and the second receiver coil;
measuring, with the receiver, a third voltage originating from the quasistatic magnetic fields due to coupling between the second transmitter coil and the first receiver coil;
measuring, with the receiver, a fourth voltage originating from the quasistatic magnetic fields due to coupling between the second transmitter coil and the second receiver coil; and
based on the first, second, third, and fourth voltages, calculating a distance between the receiver and the transmitter, wherein the measuring of each of the first, second, third, and fourth voltages is independent from the remaining voltages.

13. The method of claim 12, further comprising, based on the first, second, third, and fourth voltages, calculating an orientation of the receiver or of the transmitter.

14. The method of claim 12, further comprising, based on the first, second, third, and fourth voltages, calculating an azimuthal angle of the receiver or of the transmitter.

15. The method of claim 13, wherein calculating a distance between the receiver and the transmitter and calculating an orientation of the receiver or of the transmitter are based on mutually decoupling the distance and the orientation.

16. The method of claim 15, wherein providing a receiver comprises only one receiver system.

17. The method of claim 16, wherein calculating a distance between the receiver and the transmitter and calculating an orientation of the receiver or of the transmitter comprise receiving a location of either the receiver or the transmitter.

18. The method of claim 12, wherein independently measuring each of the first, second, third, and fourth voltages is by receiving the quasistatic magnetic fields at a different frequency for the mutually orthogonal directions.

19. The method of claim 12, wherein independently measuring each of the first, second, third, and fourth voltages is by receiving the quasistatic magnetic fields at a different time for the mutually orthogonal directions.

20. The method of claim 13, wherein calculating a distance between the receiver and the transmitter and calculating an orientation of the receiver or of the transmitter are based on decomposing a near-ground magnetoquasistatic dipole into horizontal and vertical components.

21. A method comprising:
providing a receiver, the receiver comprising a first, second and third receiver coils configured to receive quasistatic magnetic fields in a first, second and third mutually orthogonal directions transmitted by a transmitter, the transmitter comprising a first, second and third transmitter coils and configured to transmit the quasistatic magnetic fields in a fourth, fifth and sixth mutually orthogonal directions;
receiving the quasistatic magnetic fields through the receiver;
measuring, with the receiver, a first voltage originating from the quasistatic magnetic fields due to coupling between the first transmitter coil and the first receiver coil;
measuring, with the receiver, a second voltage originating from the quasistatic magnetic fields due to coupling between the first transmitter coil and the second receiver coil;
measuring, with the receiver, a third voltage originating from the quasistatic magnetic fields due to coupling between the first transmitter coil and the third receiver coil;
measuring, with the receiver, a fourth voltage originating from the quasistatic magnetic fields due to coupling between the second transmitter coil and the first receiver coil;
measuring, with the receiver, a fifth voltage originating from the quasistatic magnetic fields due to coupling between the second transmitter coil and the second receiver coil;
measuring, with the receiver, a sixth voltage originating from the quasistatic magnetic fields due to coupling between the second transmitter coil and the third receiver coil;
measuring, with the receiver, a seventh voltage originating from the quasistatic magnetic fields due to coupling between the third transmitter coil and the first receiver coil;
measuring, with the receiver, an eighth voltage originating from the quasistatic magnetic fields due to coupling between the third transmitter coil and the second receiver coil;

measuring, with the receiver, a ninth voltage originating from the quasistatic magnetic fields due to coupling between the third transmitter coil and the third receiver coil; and based on the first, second, third, fourth, fifth, sixth, seventh, eighth and ninth voltages, calculating a distance between the receiver and the transmitter, wherein the measuring of each of the first, second, third, fourth, fifth, sixth, seventh, eighth and ninth voltages is independent from the remaining voltages.

22. The method of claim 21, further comprising, based on the first, second, third, fourth, fifth, sixth, seventh, eighth and ninth voltages, calculating an orientation of the receiver or of the transmitter.

23. The method of claim 21, further comprising, based on the first, second, third, fourth, fifth, sixth, seventh, eighth and ninth voltages, calculating an azimuthal angle of the receiver or of the transmitter.

24. The method of claim 22, wherein calculating a distance between the receiver and the transmitter and calculating an orientation of the receiver or of the transmitter are based on mutually decoupling the distance and the orientation.

25. The method of claim 24, wherein independently measuring each of the first, second, third, fourth, fifth, sixth, seventh, eighth and ninth voltages is by receiving the quasistatic magnetic fields at a different frequency for the mutually orthogonal directions.

26. A method comprising:
providing a receiver, the receiver comprising a first, second and third receiver coils configured to receive quasistatic magnetic fields in a first, second and third mutually orthogonal directions;

providing a transmitter, the transmitter comprising a first, second and third transmitter coils and configured to transmit the quasistatic magnetic fields in a fourth, fifth and sixth mutually orthogonal directions;

receiving the quasistatic magnetic fields through the receiver;

measuring, with the receiver, a first voltage originating from the quasistatic magnetic fields due to coupling between the first transmitter coil and the first receiver coil;

measuring, with the receiver, a second voltage originating from the quasistatic magnetic fields due to coupling between the first transmitter coil and the second receiver coil;

measuring, with the receiver, a third voltage originating from the quasistatic magnetic fields due to coupling between the first transmitter coil and the third receiver coil;

measuring, with the receiver, a fourth voltage originating from the quasistatic magnetic fields due to coupling between the second transmitter coil and the first receiver coil;

measuring, with the receiver, a fifth voltage originating from the quasistatic magnetic fields due to coupling between the second transmitter coil and the second receiver coil;

measuring, with the receiver, a sixth voltage originating from the quasistatic magnetic fields due to coupling between the second transmitter coil and the third receiver coil;

measuring, with the receiver, a seventh voltage originating from the quasistatic magnetic fields due to coupling between the third transmitter coil and the first receiver coil;

measuring, with the receiver, an eighth voltage originating from the quasistatic magnetic fields due to coupling between the third transmitter coil and the second receiver coil;

measuring, with the receiver, a ninth voltage originating from the quasistatic magnetic fields due to coupling between the third transmitter coil and the third receiver coil; and based on the first, second, third, fourth, fifth, sixth, seventh, eighth and ninth voltages, calculating a distance between the receiver and the transmitter, wherein the measuring of each of the first, second, third, fourth, fifth, sixth, seventh, eighth and ninth voltages is independent from the remaining voltages.

27. The method of claim 26, further comprising, based on the first, second, third, fourth, fifth, sixth, seventh, eighth and ninth voltages, calculating an orientation of the receiver or of the transmitter.

28. The method of claim 26, further comprising, based on the first, second, third, fourth, fifth, sixth, seventh, eighth and ninth voltages, calculating an azimuthal angle of the receiver or of the transmitter.

29. The method of claim 27, wherein calculating a distance between the receiver and the transmitter and calculating an orientation of the receiver or of the transmitter are based on mutually decoupling the distance and the orientation.

30. The method of claim 29, wherein independently measuring each of the first, second, third, fourth, fifth, sixth, seventh, eighth and ninth voltages is by receiving the quasistatic magnetic fields at a different frequency for the mutually orthogonal directions.

* * * * *